United States Patent
Roth et al.

(10) Patent No.: US 10,939,076 B2
(45) Date of Patent: *Mar. 2, 2021

(54) STREAMING AND STORING VIDEO FOR AUDIO/VIDEO RECORDING AND COMMUNICATION DEVICES

(71) Applicant: Amazon Technologies, Inc., Seattle, WA (US)

(72) Inventors: Joshua Roth, Pacific Palisades, CA (US); Trevor Phillips, Los Angeles, CA (US); Jason Gluckman, San Diego, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/192,533

(22) Filed: Nov. 15, 2018

(65) Prior Publication Data

US 2019/0104333 A1 Apr. 4, 2019

Related U.S. Application Data

(63) Continuation of application No. 15/715,660, filed on Sep. 26, 2017, now Pat. No. 10,158,902.

(Continued)

(51) Int. Cl.
*H04N 21/41* (2011.01)
*H04N 21/214* (2011.01)
(Continued)

(52) U.S. Cl.
CPC .............. *H04N 7/186* (2013.01); *G08B 3/10* (2013.01); *G08B 13/19619* (2013.01);
(Continued)

(58) Field of Classification Search
None
See application file for complete search history.

(56) References Cited

U.S. PATENT DOCUMENTS 4,764,953 A 8/1988 Chern et al.
5,428,388 A 6/1995 von Bauer et al.
(Continued)

FOREIGN PATENT DOCUMENTS

CN 2585521 11/2003
CN 2792061 6/2006
(Continued)

OTHER PUBLICATIONS

The Chinese Office Action dated May 8, 2020 for Chinese Patent Application No. 201780058593.9, a counterpart of U.S. Pat. No. 10,158,902, 11 pages.

(Continued)

*Primary Examiner* — Ricky Chin
(74) *Attorney, Agent, or Firm* — Lee & Hayes, P.C.

(57) ABSTRACT

Streaming and storing video for audio/video (A/V) recording and communication devices in accordance with various embodiments of the present disclosure are provided. In one embodiment, a method for an A/V recording and communication device comprises: recording video image data; executing a write operation to write the video image data at a write rate; executing a read operation to read the video image data at a first read rate that is greater than the write rate; continuing to read the video image data at the first read rate until the read operation catches up to the write operation; reading the video image data at a second read rate equal to the write rate; and transmitting streaming video to a client device, wherein a beginning portion of the streaming video is streamed at a first stream rate and thereafter streaming at a second stream rate less than the first stream rate.

20 Claims, 18 Drawing Sheets

Related U.S. Application Data

(60) Provisional application No. 62/399,779, filed on Sep. 26, 2016.

(51) Int. Cl.
| | | |
|---|---|---|
| *G08B 13/196* | (2006.01) | |
| *H04N 7/18* | (2006.01) | |
| *H04N 21/436* | (2011.01) | |
| *H04N 21/414* | (2011.01) | |
| *G08B 25/10* | (2006.01) | |
| *H04L 29/06* | (2006.01) | |
| *G08B 3/10* | (2006.01) | |
| *H04N 5/77* | (2006.01) | |
| *H04N 21/24* | (2011.01) | |
| *H04N 21/2743* | (2011.01) | |

(52) U.S. Cl.
CPC . *G08B 13/19656* (2013.01); *G08B 13/19665* (2013.01); *G08B 13/19667* (2013.01); *G08B 13/19669* (2013.01); *G08B 13/19684* (2013.01); *G08B 25/10* (2013.01); *H04L 65/4069* (2013.01); *H04L 65/602* (2013.01); *H04N 5/77* (2013.01); *H04N 7/181* (2013.01); *H04N 21/2143* (2013.01); *H04N 21/2407* (2013.01); *H04N 21/2743* (2013.01); *H04N 21/414* (2013.01); *H04N 21/4126* (2013.01); *H04N 21/4131* (2013.01); *H04N 21/436* (2013.01); *H04N 21/43615* (2013.01); *G08B 13/19695* (2013.01)

(56) References Cited

U.S. PATENT DOCUMENTS

| | | | |
|---|---|---|---|
| 5,760,848 A | 6/1998 | Cho | |
| 5,996,023 A * | 11/1999 | Winter | G08B 13/19604 709/253 |
| 6,072,402 A | 6/2000 | Kniffin et al. | |
| 6,192,257 B1 | 2/2001 | Ray | |
| 6,271,752 B1 | 8/2001 | Vaios | |
| 6,429,893 B1 | 8/2002 | Xin | |
| 6,456,322 B1 | 9/2002 | Marinacci | |
| 6,476,858 B1 | 11/2002 | Ramirez Diaz et al. | |
| 6,633,231 B1 | 10/2003 | Okamoto et al. | |
| 6,658,091 B1 | 12/2003 | Naidoo et al. | |
| 6,753,774 B2 | 6/2004 | Pan et al. | |
| 6,970,183 B1 | 11/2005 | Monroe | |
| 7,062,291 B2 | 6/2006 | Ryley et al. | |
| 7,065,196 B2 | 6/2006 | Lee | |
| 7,085,361 B2 | 8/2006 | Thomas | |
| 7,109,860 B2 | 9/2006 | Wang | |
| 7,193,644 B2 | 3/2007 | Carter | |
| 7,304,572 B2 | 12/2007 | Sheynman et al. | |
| 7,382,249 B2 | 6/2008 | Fancella | |
| 7,450,638 B2 | 11/2008 | Iwamura | |
| 7,643,056 B2 | 1/2010 | Silsby | |
| 7,683,924 B2 | 3/2010 | Oh et al. | |
| 7,683,929 B2 | 3/2010 | Elazar et al. | |
| 7,738,768 B1 * | 6/2010 | Pontual | H04N 21/41422 386/241 |
| 7,738,917 B2 | 6/2010 | Ryley et al. | |
| 8,139,098 B2 | 3/2012 | Carter | |
| 8,144,183 B2 | 3/2012 | Carter | |
| 8,154,581 B2 | 4/2012 | Carter | |
| 8,619,136 B2 | 12/2013 | Howarter et al. | |
| 8,780,201 B1 | 7/2014 | Scalisi et al. | |
| 8,823,795 B1 | 9/2014 | Scalisi et al. | |
| 8,842,180 B1 | 9/2014 | Kasmir et al. | |
| 8,872,915 B1 | 10/2014 | Scalisi et al. | |
| 8,937,659 B1 | 1/2015 | Scalisi et al. | |
| 8,941,736 B1 | 1/2015 | Scalisi | |
| 8,947,530 B1 | 2/2015 | Scalisi | |
| 8,953,040 B1 | 2/2015 | Scalisi et al. | |
| 9,013,575 B2 | 4/2015 | Scalisi | |
| 9,049,352 B2 | 6/2015 | Scalisi et al. | |
| 9,053,622 B2 | 6/2015 | Scalisi | |
| 9,058,738 B1 | 6/2015 | Scalisi | |
| 9,060,103 B2 | 6/2015 | Scalisi | |
| 9,060,104 B2 | 6/2015 | Scalisi | |
| 9,065,987 B2 | 6/2015 | Kasmir et al. | |
| 9,094,584 B2 | 7/2015 | Scalisi et al. | |
| 9,113,051 B1 | 8/2015 | Scalisi | |
| 9,113,052 B1 | 8/2015 | Scalisi et al. | |
| 9,118,819 B1 | 8/2015 | Scalisi et al. | |
| 9,142,214 B2 | 9/2015 | Scalisi | |
| 9,160,987 B1 | 10/2015 | Kasmir et al. | |
| 9,165,444 B2 | 10/2015 | Scalisi | |
| 9,172,920 B1 | 10/2015 | Kasmir et al. | |
| 9,172,921 B1 | 10/2015 | Scalisi et al. | |
| 9,172,922 B1 | 10/2015 | Kasmir et al. | |
| 9,179,107 B1 | 11/2015 | Scalisi et al. | |
| 9,179,108 B1 | 11/2015 | Scalisi et al. | |
| 9,179,109 B1 | 11/2015 | Kasmir et al. | |
| 9,196,133 B2 | 11/2015 | Scalisi et al. | |
| 9,197,867 B1 | 11/2015 | Scalisi et al. | |
| 9,230,424 B1 | 1/2016 | Scalisi et al. | |
| 9,237,318 B2 | 1/2016 | Kasmir et al. | |
| 9,247,219 B2 | 1/2016 | Kasmir et al. | |
| 9,253,455 B1 | 2/2016 | Harrison et al. | |
| 9,342,936 B2 | 5/2016 | Scalisi | |
| 9,508,239 B1 | 11/2016 | Harrison et al. | |
| 9,736,284 B2 | 8/2017 | Scalisi et al. | |
| 9,743,049 B2 | 8/2017 | Scalisi et al. | |
| 9,769,435 B2 | 9/2017 | Scalisi et al. | |
| 9,786,133 B2 | 10/2017 | Harrison et al. | |
| 9,799,183 B2 | 10/2017 | Harrison et al. | |
| 10,586,109 B1 * | 3/2020 | Fowler | G01S 5/18 |
| 2002/0094111 A1 | 7/2002 | Puchek et al. | |
| 2002/0147982 A1 | 10/2002 | Naidoo et al. | |
| 2003/0043047 A1 | 3/2003 | Braun | |
| 2004/0085205 A1 | 5/2004 | Yeh | |
| 2004/0085450 A1 | 5/2004 | Stuart | |
| 2004/0086093 A1 | 5/2004 | Schranz | |
| 2004/0095254 A1 | 5/2004 | Maruszczak | |
| 2004/0135686 A1 | 7/2004 | Parker | |
| 2004/0141436 A1 * | 7/2004 | Monahan | G11B 7/14 369/47.24 |
| 2005/0111660 A1 | 5/2005 | Hosoda | |
| 2006/0010199 A1 | 1/2006 | Brailean | |
| 2006/0022816 A1 | 2/2006 | Yukawa | |
| 2006/0139449 A1 | 6/2006 | Cheng et al. | |
| 2006/0156361 A1 | 7/2006 | Wang et al. | |
| 2007/0008081 A1 | 1/2007 | Tylicki et al. | |
| 2007/0130393 A1 * | 6/2007 | Versteeg | H04L 47/10 710/57 |
| 2008/0288986 A1 * | 11/2008 | Foster | G08B 13/19656 725/62 |
| 2010/0149303 A1 | 6/2010 | Thorne et al. | |
| 2010/0225455 A1 | 9/2010 | Claiborne et al. | |
| 2011/0200304 A1 | 8/2011 | Rutledge | |
| 2012/0124294 A1 | 5/2012 | Atkisson et al. | |
| 2014/0267716 A1 | 9/2014 | Child et al. | |
| 2015/0070495 A1 * | 3/2015 | Scalisi | H04M 1/0291 348/143 |
| 2015/0098686 A1 * | 4/2015 | Obukhov | G08B 13/19656 386/226 |
| 2015/0163463 A1 * | 6/2015 | Hwang | H04N 7/188 348/143 |
| 2016/0044160 A1 * | 2/2016 | Redmann | H04M 3/436 379/88.03 |
| 2016/0191912 A1 | 6/2016 | Lea et al. | |
| 2016/0322045 A1 * | 11/2016 | Hatfield | G10L 21/0208 |
| 2018/0109999 A1 | 4/2018 | Finnegan | |

FOREIGN PATENT DOCUMENTS

| | | |
|---|---|---|
| CN | 102262657 | 11/2011 |
| CN | 105245843 | 1/2016 |
| CN | 105812742 | 7/2016 |
| EP | 0633694 | 1/1995 |
| EP | 0944883 | 9/1999 |

(56) References Cited

FOREIGN PATENT DOCUMENTS

| | | |
|---|---|---|
| EP | 1480462 | 11/2004 |
| GB | 2286283 | 8/1995 |
| GB | 2354394 | 3/2001 |
| GB | 2357387 | 6/2001 |
| GB | 2400958 | 10/2004 |
| JP | 2001103463 | 4/2001 |
| JP | 2002033839 | 1/2002 |
| JP | 2002125059 | 4/2002 |
| JP | 2002342863 | 11/2002 |
| JP | 2002344640 | 11/2002 |
| JP | 2002354137 | 12/2002 |
| JP | 2002368890 | 12/2002 |
| JP | 2003179697 | 6/2003 |
| JP | 2003283696 | 10/2003 |
| JP | 2004128835 | 4/2004 |
| JP | 2005341040 | 12/2005 |
| JP | 2006147650 | 6/2006 |
| JP | 2006262342 | 9/2006 |
| JP | 2009008925 | 1/2009 |
| JP | 2013543699 | 12/2013 |
| WO | WO9839894 | 9/1998 |
| WO | WO0113638 | 2/2001 |
| WO | WO0193220 | 12/2001 |
| WO | WO02085019 | 10/2002 |
| WO | WO03053059 | 3/2003 |
| WO | WO03028375 | 4/2003 |
| WO | WO2003053059 | 6/2003 |
| WO | WO03096696 | 11/2003 |
| WO | WO2006038760 | 4/2006 |
| WO | WO2006067782 | 6/2006 |
| WO | WO2007125143 | 11/2007 |

OTHER PUBLICATIONS

The Chinese Office Action dated May 8, 2020 for Chinese Patent Application No. 201780058593.9, a counterpart of U.S. Pat. No. 10,158,902, 10 pages.

The Japanese Office Action dated Jun. 22, 2020 for Japanese Patent Application No. 2019-515257, a counterpart of U.S. Pat. No. 10,158,902, 8 pages.

* cited by examiner

STREAMING AND STORING VIDEO FOR AUDIO/VIDEO RECORDING AND COMMUNICATION DEVICES

CROSS-REFERENCE TO RELATED APPLICATION

This application is a continuation of application Ser. No. 15/715,660, filed on Sep. 26, 2017, which claims priority to provisional application Ser. No. 62/399,779, filed on Sep. 26, 2016. The entire contents of the priority applications are hereby incorporated by reference as if fully set forth.

TECHNICAL FIELD

The present embodiments relate to audio/video (AN) recording and communication devices, including A/V recording and communication doorbell systems. In particular, the present embodiments relate to improvements in the functionality of A/V recording and communication devices that enhance the streaming and storing of video recorded by such devices.

BACKGROUND

Home safety is a concern for many homeowners and renters. Those seeking to protect or monitor their homes often wish to have video and audio communications with visitors, for example, those visiting an external door or entryway. Audio/Video (A/V) recording and communication doorbell systems provide this functionality, and can also aid in crime detection and prevention. For example, audio and/or video captured by an A/V recording and communication doorbell can be uploaded to the cloud and recorded on a remote server. Subsequent review of the A/V footage can aid law enforcement in capturing perpetrators of home burglaries and other crimes. Further, the presence of an A/V recording and communication doorbell at the entrance to a home acts as a powerful deterrent against would-be burglars.

BRIEF DESCRIPTION OF THE DRAWINGS

The various embodiments of the present streaming and storing video for audio/video recording and communication devices now will be discussed in detail with an emphasis on highlighting the advantageous features. These embodiments depict the novel and non-obvious streaming and storing video for audio/video recording and communication devices shown in the accompanying drawings, which are for illustrative purposes only. These drawings include the following figures, in which like numerals indicate like parts.

DETAILED DESCRIPTION

Figure 1:
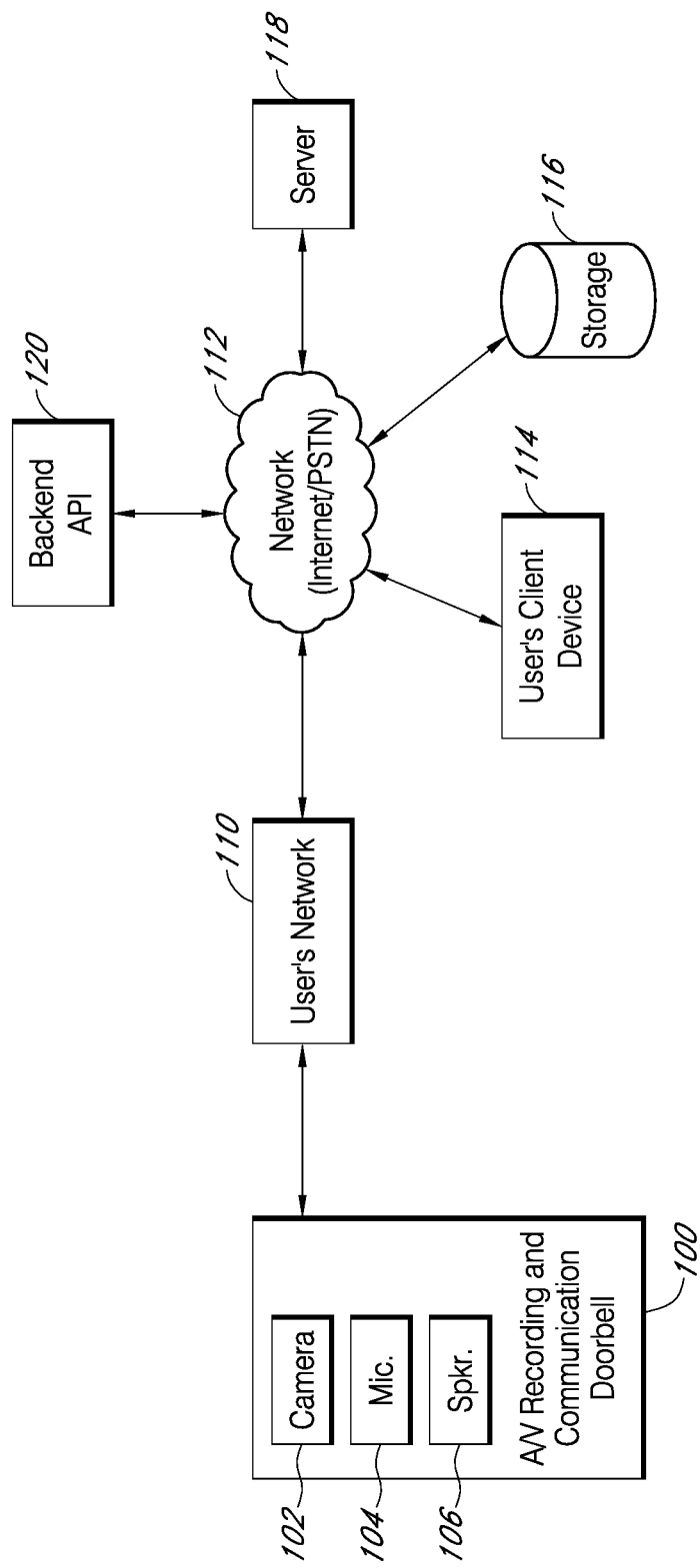
FIG. 1 is a functional block diagram illustrating one embodiment of an A/V recording and communication doorbell system according to the present embodiments.

The various embodiments of the present streaming and storing video for audio/video recording and communication devices have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

One aspect of the present embodiments includes the realization that in current audio/video (A/V) recording and communication devices (e.g., doorbells) other than the present embodiments, streaming video that is sent from the A/V recording and communication device to the user's client device does not include any images of events that took place prior to the event that triggered the sending of the streaming video. For example, when the A/V recording and communication device detects an event, such as motion in the area about the A/V recording and communication device or a visitor pressing the front button of the A/V recording and communication device (when the A/V recording and communication device is a doorbell), the streaming video that is sent from the A/V recording and communication device to the user's client device begins at (or just after) the moment that the motion was detected or the front button was pressed. Often, however, the events that occurred just prior to the event detection are of interest to the user. The present embodiments solve this problem by continuously recording, with the camera of the A/V recording and communication device, the area within the field of view of the camera and, then, when an event is detected, beginning the streaming video at a time that is prior to the event detection. The continuously recorded video images are stored in a rolling buffer, and the streaming video begins from the beginning of the rolling buffer. In order that the streaming video can be presented to the user in real time, a beginning portion of the streaming video is read out of the rolling buffer and streamed to the user's client device at a rate that is higher than the rate at which the video image data is written to the rolling buffer. When the read operation catches up to the write operation, the read rate drops to match the write rate. The present embodiments thus advantageously enable the user to view video images of events that happened just prior to the detected event, thereby delivering more information to the user to help the user better understand what is taking place in the streaming video.

The following detailed description describes the present embodiments with reference to the drawings. In the drawings, reference numbers label elements of the present embodiments. These reference numbers are reproduced below in connection with the discussion of the corresponding drawing features.

The embodiments of the present streaming and storing video for audio/video recording and communication devices are described below with reference to the figures. These figures, and their written descriptions, indicate that certain components of the apparatus are formed integrally, and certain other components are formed as separate pieces. Those of ordinary skill in the art will appreciate that components shown and described herein as being formed integrally may in alternative embodiments be formed as separate pieces. Those of ordinary skill in the art will further appreciate that components shown and described herein as being formed as separate pieces may in alternative embodiments be formed integrally. Further, as used herein the term integral describes a single unitary piece.

With reference to FIG. 1, the present embodiments include an audio/video (A/V) recording and communication doorbell 100. The A/V recording and communication doorbell 100 is may be located near the entrance to a structure (not shown), such as a dwelling, a business, a storage facility, etc. The A/V recording and communication doorbell 100 includes a camera 102, a microphone 104, and a speaker 106. The camera 102 may comprise, for example, a high definition (HD) video camera, such as one capable of capturing video images at an image display resolution of 720p or better. While not shown, the A/V recording and communication doorbell 100 may also include other hardware and/or components, such as a housing, one or more motion sensors (and/or other types of sensors), a button, etc. The A/V recording and communication doorbell 100 may further include similar componentry and/or functionality as the wireless communication doorbells described in US Patent Application Publication Nos. 2015/0022620 (application Ser. No. 14/499,828) and 2015/0022618 (application Ser. No. 14/334,922), both of which are incorporated herein by reference in their entireties as if fully set forth.

With further reference to FIG. 1, the A/V recording and communication doorbell 100 communicates with a user's network 110, which may be for example a wired and/or wireless network. If the user's network 110 is wireless, or includes a wireless component, the network 110 may be a Wi-Fi network compatible with the IEEE 802.11 standard and/or other wireless communication standard(s). The user's network 110 is connected to another network 112, which may comprise, for example, the Internet and/or a public switched telephone network (PSTN). As described below, the A/V recording and communication doorbell 100 may communicate with a user's client device 114 via the user's network 110 and the network 112 (Internet/PSTN). The user's client device 114 may comprise, for example, a mobile telephone (may also be referred to as a cellular telephone), such as a smartphone, a personal digital assistant (PDA), or another communication and/or computing device. The user's client device 114 comprises a display (not shown) and related components capable of displaying streaming and/or recorded video images. The user's client device 114 may also comprise a speaker and related components capable of broadcasting streaming and/or recorded audio, and may also comprise a microphone. The A/V recording and communication doorbell 100 may also communicate with one or more remote storage device(s) 116 (may be referred to interchangeably as "cloud storage device(s)"), one or more servers 118, and/or a backend API (application programming interface) 120 via the user's network 110 and the network 112 (Internet/PSTN). While FIG. 1 illustrates the storage device 116, the server 118, and the backend API 120 as components separate from the network 112, it is to be understood that the storage device 116, the server 118, and/or the backend API 120 may be considered to be components of the network 112.

The network 112 may be any wireless network or any wired network, or a combination thereof, configured to operatively couple the above-mentioned modules, devices, and systems as shown in FIG. 1. For example, the network 112 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), LTE, VoLTE, LoRaWAN, LPWAN, RPMA, LTE, Cat-"X" (e.g. LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, GPS, CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-1394 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

According to one or more aspects of the present embodiments, when a person (may be referred to interchangeably as "visitor") arrives at the A/V recording and communication doorbell 100, the A/V recording and communication doorbell 100 detects the visitor's presence and begins capturing video images within a field of view of the camera 102. The A/V recording and communication doorbell 100 may also capture audio through the microphone 104. The A/V recording and communication doorbell 100 may detect the visitor's presence by detecting motion using the camera 102 and/or a motion sensor, and/or by detecting that the visitor has pressed a front button of the A/V recording and communication doorbell 100.

In response to the detection of the visitor, the A/V recording and communication doorbell 100 sends an alert to the user's client device 114 (FIG. 1) via the user's network 110 and the network 112. The A/V recording and communication doorbell 100 also sends streaming video, and may also send streaming audio, to the user's client device 114. If the user answers the alert, two-way audio communication may then occur between the visitor and the user through the A/V recording and communication doorbell 100 and the user's client device 114. The user may view the visitor throughout the duration of the call, but the visitor cannot see the user (unless the A/V recording and communication doorbell 100 includes a display, which it may in some embodiments).

The video images captured by the camera 102 of the A/V recording and communication doorbell 100 (and the audio captured by the microphone 104) may be uploaded to the cloud and recorded on the remote storage device 116 (FIG. 1). In some embodiments, the video and/or audio may be recorded on the remote storage device 116 even if the user chooses to ignore the alert sent to his or her client device 114.

With further reference to FIG. 1, the system may further comprise a backend API 120 including one or more components. A backend API (application programming interface) may comprise, for example, a server (e.g. a real server, or a virtual machine, or a machine running in a cloud infrastructure as a service), or multiple servers networked together, exposing at least one API to client(s) accessing it. These servers may include components such as application servers (e.g. software servers), depending upon what other components are included, such as a caching layer, or database layers, or other components. A backend API may, for example, comprise many such applications, each of which communicate with one another using their public APIs. In some embodiments, the API backend may hold the bulk of the user data and offer the user management capabilities, leaving the clients to have a very limited state.

The backend API 120 illustrated in FIG. 1 may include one or more APIs. An API is a set of routines, protocols, and tools for building software and applications. An API expresses a software component in terms of its operations, inputs, outputs, and underlying types, defining functionalities that are independent of their respective implementations, which allows definitions and implementations to vary without compromising the interface. Advantageously, an API may provide a programmer with access to an application's functionality without the programmer needing to modify the application itself, or even understand how the application works. An API may be for a web-based system, an operating system, or a database system, and it provides facilities to develop applications for that system using a given programming language. In addition to accessing databases or computer hardware like hard disk drives or video cards, an API can ease the work of programming GUI components. For example, an API can facilitate integration of new features into existing applications (a so-called "plug-in API"). An API can also assist otherwise distinct applications with sharing data, which can help to integrate and enhance the functionalities of the applications.

The backend API 120 illustrated in FIG. 1 may further include one or more services (also referred to as network services). A network service is an application that provides data storage, manipulation, presentation, communication, and/or other capability. Network services are often implemented using a client-server architecture based on application-layer network protocols. Each service may be provided by a server component running on one or more computers (such as a dedicated server computer offering multiple services) and accessed via a network by client components running on other devices. However, the client and server components can both be run on the same machine. Clients and servers may have a user interface, and sometimes other hardware associated with them.

Figure 2:
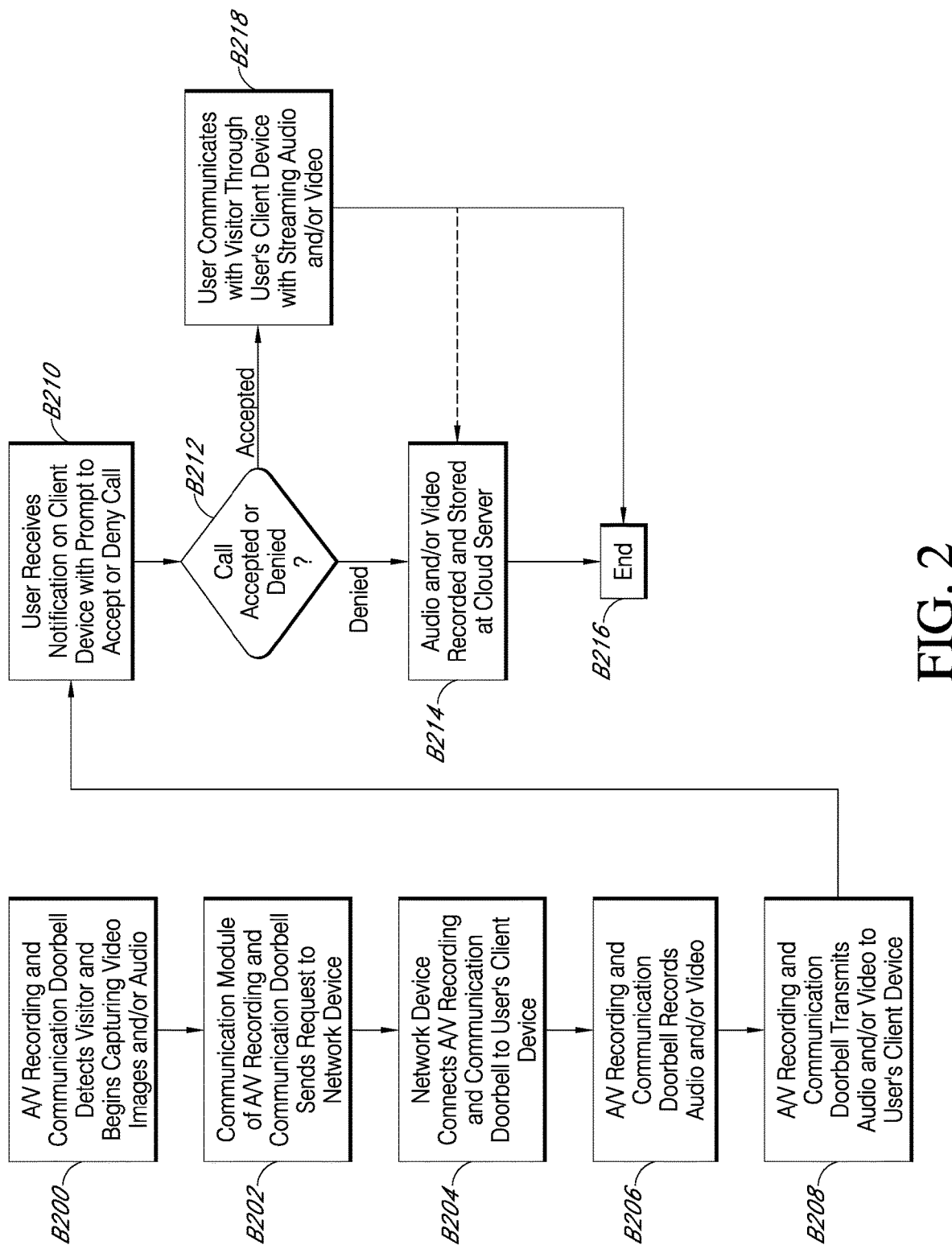
FIG. 2 is a flowchart illustrating one embodiment of a process for streaming and storing A/V content from an A/V recording and communication doorbell system according to various aspects of the present disclosure.

FIG. 2 is a flowchart illustrating a process for streaming and storing A/V content from an A/V recording and communication doorbell system according to various aspects of the present disclosure. At block B200, the A/V recording and communication doorbell 100 detects the visitor's presence and begins capturing video images within a field of view of the camera 102. The A/V recording and communication doorbell 100 may also capture audio through the microphone 104. As described above, the A/V recording and communication doorbell 100 may detect the visitor's presence by detecting motion using the camera 102 and/or a motion sensor, and/or by detecting that the visitor has depressed the button on the A/V recording and communication doorbell 100.

At block B202, a communication module of the A/V recording and communication doorbell 100 sends a connection request, via the user's network 110 and the network 112, to a device in the network 112. For example, the network device to which the request is sent may be a server such as the server 118. The server 118 may comprise a computer program and/or a machine that waits for requests from other machines or software (clients) and responds to them. A server typically processes data. One purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

In response to the request, at block B204 the network device may connect the A/V recording and communication doorbell 100 to the user's client device 114 through the user's network 110 and the network 112. At block B206, the A/V recording and communication doorbell 100 may record available audio and/or video data using the camera 102, the microphone 104, and/or any other sensor available. At block B208, the audio and/or video data is transmitted (streamed) from the A/V recording and communication doorbell 100 to the user's client device 114 via the user's network 110 and the network 112. At block B210, the user may receive a notification on his or her client device 114 with a prompt to either accept or deny the call.

At block B212, the process determines whether the user has accepted or denied the call. If the user denies the notification, then the process advances to block B214, where the audio and/or video data is recorded and stored at a cloud server. The session then ends at block B216 and the connection between the A/V recording and communication doorbell 100 and the user's client device 114 is terminated. If, however, the user accepts the notification, then at block B218 the user communicates with the visitor through the user's client device 114 while audio and/or video data captured by the camera 102, the microphone 104, and/or other sensors is streamed to the user's client device 114. At the end of the call, the user may terminate the connection between the user's client device 114 and the A/V recording and communication doorbell 100 and the session ends at block B216. In some embodiments, the audio and/or video data may be recorded and stored at a cloud server (block B214) even if the user accepts the notification and communicates with the visitor through the user's client device 114.

Many of today's homes include a wired doorbell system that does not have A/V communication capabilities. Instead, standard wired doorbell systems include a button outside the home next to the front door. The button activates a signaling device (such as a bell or a buzzer) inside the building. Pressing the doorbell button momentarily closes the doorbell circuit, which may be, for example, a single-pole, single-throw (SPST) push button switch. One terminal of the button is wired to a terminal on a transformer. The transformer steps down the 120-volt or 240-volt household AC electrical power to a lower voltage, typically 16 to 24 volts. Another terminal on the transformer is wired to a terminal on the signaling device. Another terminal on the signaling device is wired to the other terminal on the button. A common signaling device includes two flat metal bar resonators, which are struck by plungers operated by two solenoids. The flat bars are tuned to different notes. When the doorbell button is pressed, the first solenoid's plunger strikes one of the bars, and when the button is released, a spring on the plunger pushes the plunger up, causing it to strike the other bar, creating a two-tone sound ("ding-dong").

Many current A/V recording and communication doorbell systems (other than the present embodiments) are incompatible with existing wired doorbell systems of the type described in the preceding paragraph. One reason for this incompatibility is that the A/V recording and communication doorbell draws an amount of power from the household AC electrical power supply that is above the threshold necessary for causing the signaling device to sound. The A/V recording and communication doorbell thus causes frequent inadvertent sounding of the signaling device, which is not only bothersome to the home's occupant(s), but also undermines the usefulness of the doorbell. The present embodiments solve this problem by limiting the power consumption of the A/V recording and communication doorbell to an amount that is below the threshold necessary for causing the signaling device to sound. Embodiments of the present A/V recording and communication doorbell can thus be connected to the existing household AC power supply and the existing signaling device without causing inadvertent sounding of the signaling device.

Several advantages flow from the ability of the present embodiments to be connected to the existing household AC power supply. For example, the camera of the present A/V recording and communication doorbell can be powered on continuously. In a typical battery-powered A/V recording and communication doorbell, the camera is powered on only part of the time so that the battery does not drain too rapidly. The present embodiments, by contrast, do not rely on a battery as a primary (or sole) power supply, and are thus able to keep the camera powered on continuously. Because the camera is able to be powered on continuously, it can always be recording, and recorded footage can be continuously stored in a rolling buffer or sliding window. In some embodiments, about 10-15 seconds of recorded footage can be continuously stored in the rolling buffer or sliding window. Also, because the camera is able to be powered on continuously, it can be used for motion detection, thus eliminating any need for a separate motion detection device, such as a passive infrared sensor (PIR). Eliminating the PIR simplifies the design of the A/V recording and communication doorbell and enables the doorbell to be made more compact. Also, because the camera is able to be powered on continuously, it can be used as a light detector for use in controlling the current state of the IR cut filter and turning the IR LED on and off. Using the camera as a light detector eliminates any need for a separate light detector, thereby further simplifying the design of the A/V recording and communication doorbell and enabling the doorbell to be made even more compact.

Figure 3:
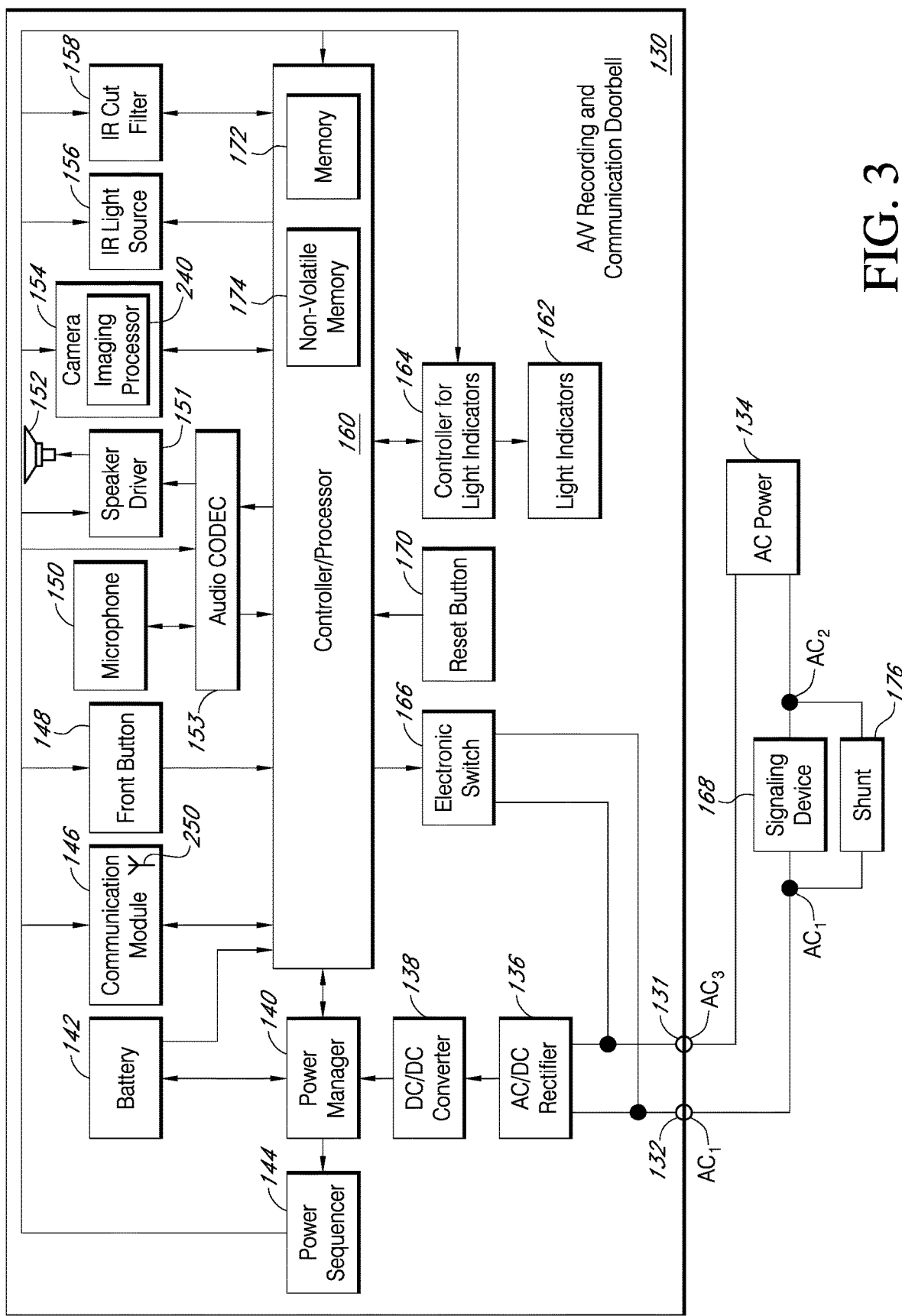
FIG. 3 is a functional block diagram illustrating an embodiment of an A/V recording and communication doorbell system according to the present disclosure.

FIGS. 3-13 illustrate one embodiment of a low-power-consumption A/V recording and communication doorbell 130 according to various aspects of the present disclosure. FIG. 3 is a functional block diagram illustrating various components of the A/V recording and communication doorbell 130 and their relationships to one another. For example, the A/V recording and communication doorbell 130 includes a pair of terminals 131, 132 configured to be connected to a source of external AC (alternating-current) power, such as a household AC power supply 134 (may also be referred to as AC mains). The AC power 134 may have a voltage in the range of 16-24 VAC, for example. The incoming AC power 134 may be converted to DC (direct-current) by an AC/DC rectifier 136. An output of the AC/DC rectifier 136 may be connected to an input of a DC/DC converter 138, which may step down the voltage from the output of the AC/DC rectifier 136 from 16-24 VDC to a lower voltage of about 5 VDC, for example. In various embodiments, the output of the DC/DC converter 138 may be in a range of from about 2.5 V to about 7.5 V, for example.

With further reference to FIG. 3, the output of the DC/DC converter 138 is connected to a power manager 140, which may comprise an integrated circuit including a processor core, memory, and/or programmable input/output peripherals. In one non-limiting example, the power manager 140 may be an off-the-shelf component, such as the BQ24773 chip manufactured by Texas Instruments. As described in detail below, the power manager 140 controls, among other things, an amount of power drawn from the external power supply 134, as well as an amount of supplemental power drawn from a battery 142, to power the A/V recording and communication doorbell 130. The power manager 140 may, for example, limit the amount of power drawn from the external power supply 134 so that a threshold power draw is not exceeded. In one non-limiting example, the threshold power, as measured at the output of the DC/DC converter 138, may be equal to 1.4 A. The power manager 140 may also control an amount of power drawn from the external power supply 134 and directed to the battery 142 for recharging of the battery 142. An output of the power manager 140 is connected to a power sequencer 144, which controls a sequence of power delivery to other components of the A/V recording and communication doorbell 130, including a communication module 146, a front button 148, a microphone 150, a speaker driver 151, a speaker 152, an audio CODEC (Coder-DECoder) 153, a camera 154, an infrared (IR) light source 156, an IR cut filter 158, a processor 160 (may also be referred to as a controller 160), a plurality of light indicators 162, and a controller 164 for the light indicators 162. Each of these components is described in detail below. The power sequencer 144 may comprise an integrated circuit including a processor core, memory, and/or programmable input/output peripherals. In one non-limiting example, the power sequencer 144 may be an off-the-shelf component, such as the RT5024 chip manufactured by Richtek.

With further reference to FIG. 3, the A/V recording and communication doorbell 130 further comprises an electronic switch 166 that closes when the front button 148 is depressed. When the electronic switch 166 closes, power from the AC power source 134 is diverted through a signaling device 168 that is external to the A/V recording and communication doorbell 130 to cause the signaling device 168 to emit a sound, as further described below. In one non-limiting example, the electronic switch 166 may be a triac device. The A/V recording and communication doorbell 130 further comprises a reset button 170 configured to initiate a hard reset of the processor 160, as further described below.

With further reference to FIG. 3, the processor 160 may perform data processing and various other functions, as described below. The processor 160 may comprise an integrated circuit including a processor core, memory 172, non-volatile memory 174, and/or programmable input/output peripherals (not shown). The memory 172 may comprise, for example, DDR3 (double data rate type three synchronous dynamic random-access memory). The non-volatile memory 174 may comprise, for example, NAND flash memory. In the embodiment illustrated in FIG. 3, the memory 172 and the non-volatile memory 174 are illustrated within the box representing the processor 160. It is to be understood that the embodiment illustrated in FIG. 3 is merely an example, and in some embodiments the memory 172 and/or the non-volatile memory 174 are not necessarily physically incorporated with the processor 160. The memory 172 and/or the non-volatile memory 174, regardless of their physical location, may be shared by one or more other components (in addition to the processor 160) of the present A/V recording and communication doorbell 130.

The transfer of digital audio between the user and a visitor may be compressed and decompressed using the audio CODEC 153, which is operatively coupled to the processor 160. When the visitor speaks, audio from the visitor is compressed by the audio CODEC 153, digital audio data is sent through the communication module 146 to the network 112 via the user's network 110, routed by the server 118 and delivered to the user's client device 114. When the user speaks, after being transferred through the network 112, the user's network 110, and the communication module 146, the digital audio data is decompressed by the audio CODEC 153 and emitted to the visitor through the speaker 152, which is driven by the speaker driver 151.

With further reference to FIG. 3, some of the present embodiments may include a shunt 176 connected in parallel with the signaling device 168. The shunt 176 facilitates the ability of the A/V recording and communication doorbell 130 to draw power from the AC power source 134 without inadvertently triggering the signaling device 168. The shunt 176, during normal standby operation, presents a relatively low electrical impedance, such as a few ohms, across the terminals of the signaling device 168. Most of the current drawn by the A/V recording and communication doorbell 130, therefore, flows through the shunt 176, and not through the signaling device 168. The shunt 176, however, contains electronic circuitry (described below) that switches the shunt 176 between a state of low impedance, such as a few ohms, for example, and a state of high impedance, such as >1K ohms, for example. When the front button 148 of the A/V recording and communication doorbell 130 is pressed, the electronic switch 166 closes, causing the voltage from the AC power source 134 to be impressed mostly across the shunt 176 and the signaling device 168 in parallel, while a small amount of voltage, such as about 1V, is impressed across the electronic switch 166. The circuitry in the shunt 176 senses this voltage, and switches the shunt 176 to the high impedance state, so that power from the AC power source 134 is diverted through the signaling device 168. The diverted AC power 134 is above the threshold necessary to cause the signaling device 168 to emit a sound. Pressing the front button 148 of the doorbell 130 therefore causes the signaling device 168 to "ring," alerting any person(s) within the structure to which the doorbell 130 is mounted that there is a visitor at the front door (or at another location corresponding to the location of the doorbell 130). In one non-limiting example, the electronic switch 166 may be a triac device.

Figure 4:
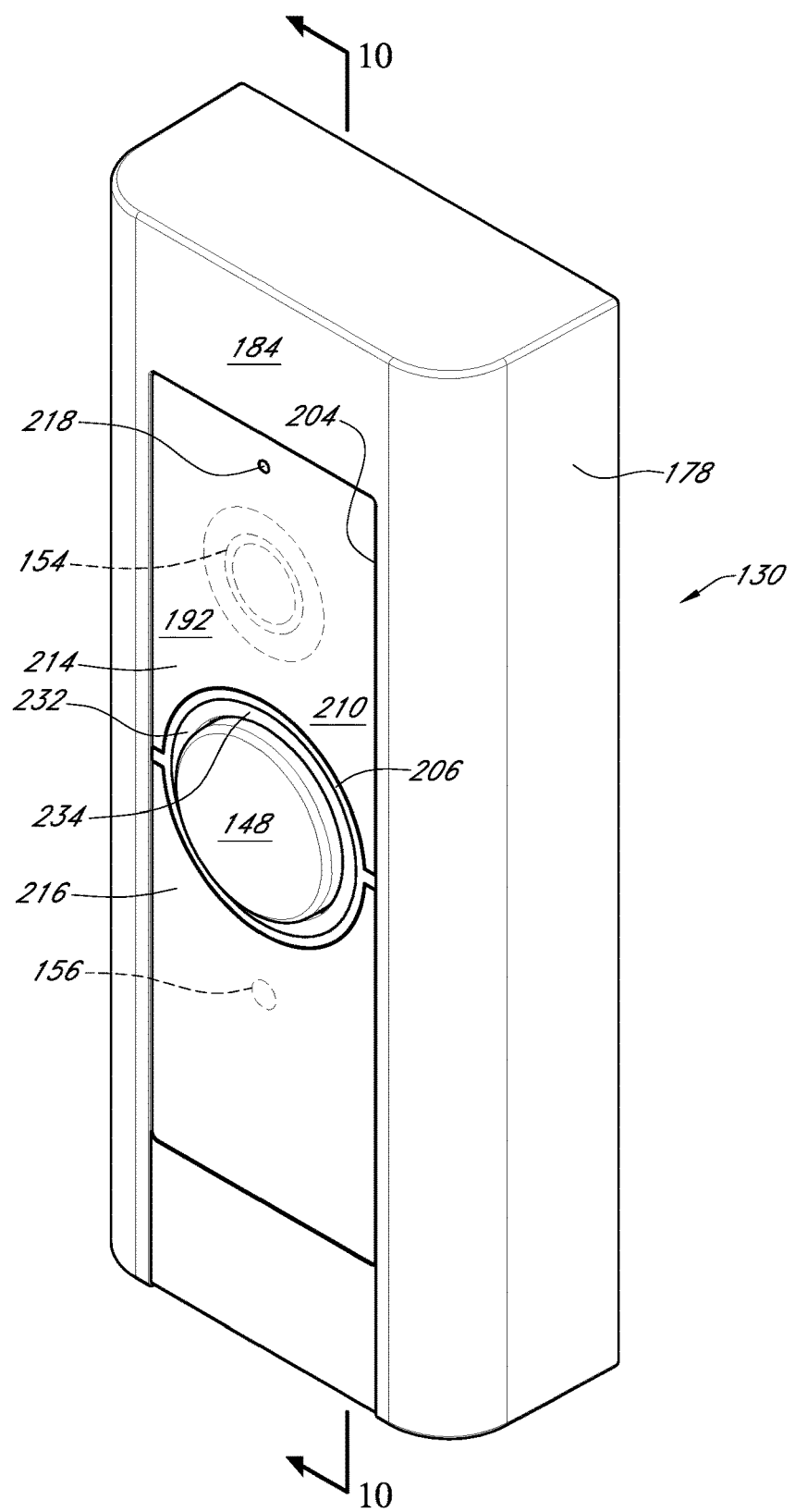
FIG. 4 is a front perspective view of an embodiment of an A/V recording and communication doorbell according to the present disclosure.
Figure 5:
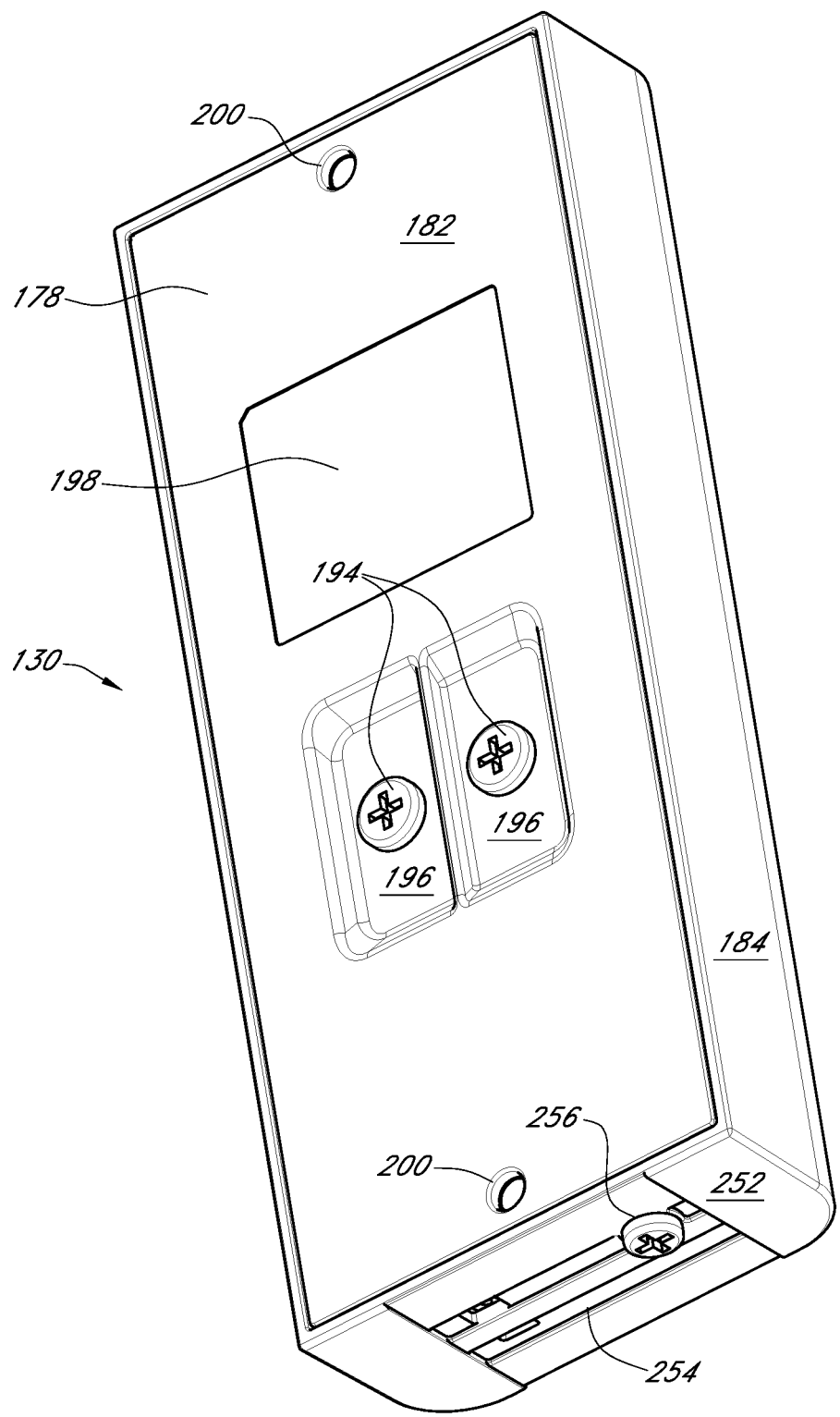
FIG. 5 is a rear perspective view of the A/V recording and communication doorbell of FIG. 4.
Figure 6:
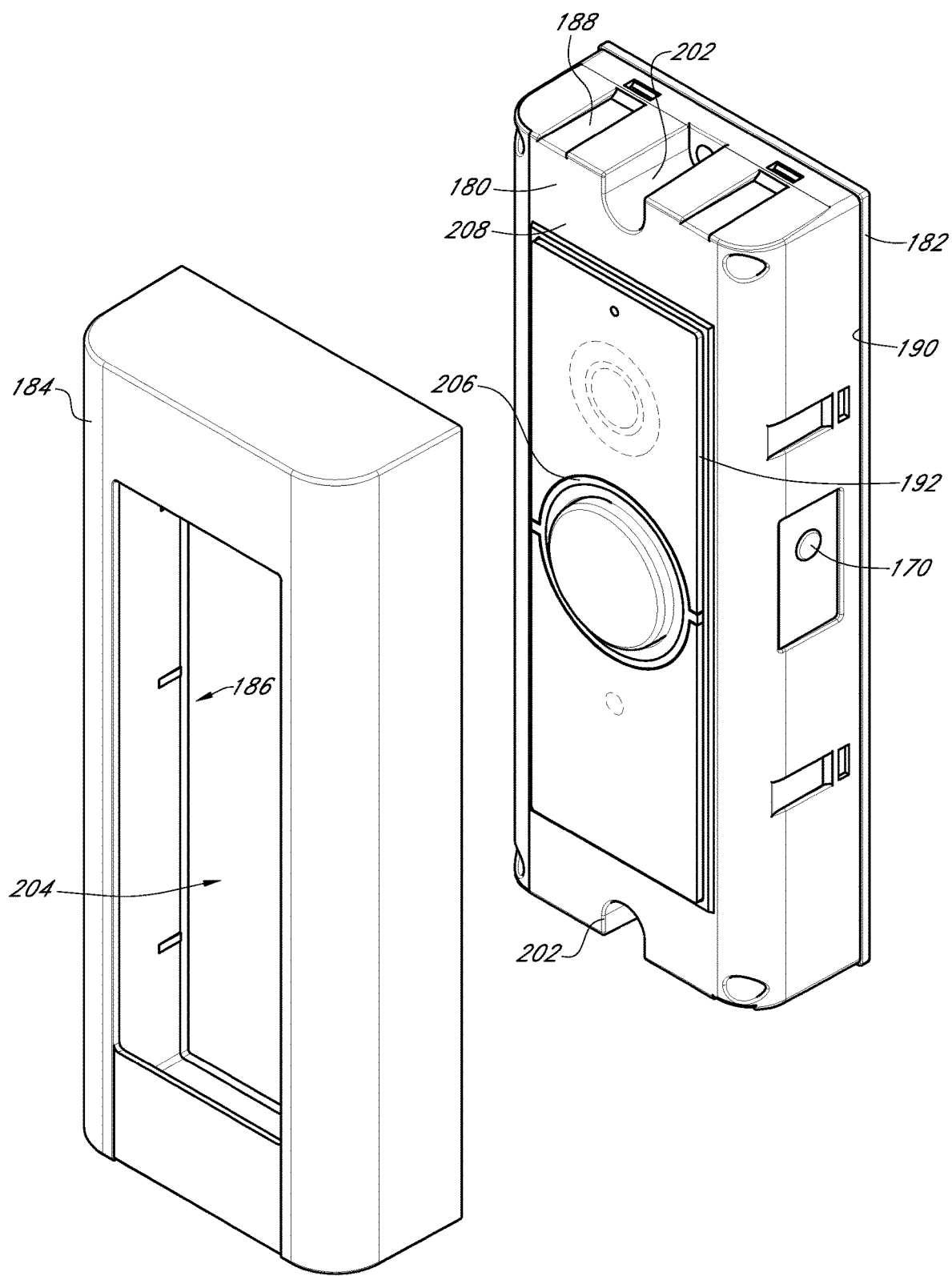
FIG. 6 is a partially exploded front perspective view of the A/V recording and communication doorbell of FIG. 4 showing the cover removed.

With reference to FIGS. 4-6, the A/V recording and communication doorbell 130 further comprises a housing 178 having an enclosure 180 (FIG. 6), a back plate 182 secured to the rear of the enclosure 180, and a shell 184 overlying the enclosure 180. With reference to FIG. 6, the shell 184 includes a recess 186 that is sized and shaped to receive the enclosure 180 in a close fitting engagement, such that outer surfaces of the enclosure 180 abut conforming inner surfaces of the shell 184. Exterior dimensions of the enclosure 180 may be closely matched with interior dimensions of the shell 184 such that friction maintains the shell 184 about the enclosure 180. Alternatively, or in addition, the enclosure 180 and/or the shell 184 may include mating features 188, such as one or more tabs, grooves, slots, posts, etc. to assist in maintaining the shell 184 about the enclosure 180. The back plate 182 is sized and shaped such that the edges of the back plate 182 extend outward from the edges of the enclosure 180, thereby creating a lip 190 against which the shell 184 abuts when the shell 184 is mated with the enclosure 180, as shown in FIGS. 4 and 5. In some embodiments, multiple shells 184 in different colors may be provided so that the end user may customize the appearance of his or her A/V recording and communication doorbell 130. For example, the A/V recording and communication doorbell 130 may be packaged and sold with multiple shells 184 in different colors in the same package.

With reference to FIG. 4, a front surface of the A/V recording and communication doorbell 130 includes the button 148 (may also be referred to as front button 148, FIG. 3), which is operatively connected to the processor 160. In a process similar to that described above with reference to FIG. 2, when a visitor presses the front button 148, an alert may be sent to the user's client device to notify the user that someone is at his or her front door (or at another location corresponding to the location of the A/V recording and communication doorbell 130). With further reference to FIG. 4, the A/V recording and communication doorbell 130 further includes the camera 154, which is operatively connected to the processor 160, and which is located behind a shield 192. As described in detail below, the camera 154 is configured to capture video images from within its field of view. Those video images can be streamed to the user's client device and/or uploaded to a remote network device for later viewing according to a process similar to that described above with reference to FIG. 2.

With reference to FIG. 5, a pair of terminal screws 194 extends through the back plate 182. The terminal screws 194 are connected at their inner ends to the terminals 131, 132 (FIG. 3) within the A/V recording and communication doorbell 130. The terminal screws 194 are configured to receive electrical wires to connect to the A/V recording and communication doorbell 130, through the terminals 131, 132, to the household AC power supply 134 of the structure on which the A/V recording and communication doorbell 130 is mounted. In the illustrated embodiment, the terminal screws 194 are located within a recessed portion 196 of the rear surface 198 of the back plate 182 so that the terminal screws 194 do not protrude from the outer envelope of the A/V recording and communication doorbell 130. The A/V recording and communication doorbell 130 can thus be mounted to a mounting surface with the rear surface 198 of the back plate 182 abutting the mounting surface. The back plate 182 includes apertures 200 adjacent its upper and lower edges to accommodate mounting hardware, such as screws (not shown), for securing the back plate 182 (and thus the A/V recording and communication doorbell 130) to the mounting surface. With reference to FIG. 6, the enclosure 180 includes corresponding apertures 202 adjacent its upper and lower edges that align with the apertures 200 in the back plate 182 to accommodate the mounting hardware. In certain embodiments, the A/V recording and communication doorbell 130 may include a mounting plate or bracket (not shown) to facilitate securing the A/V recording and communication doorbell 130 to the mounting surface.

Figure 10:
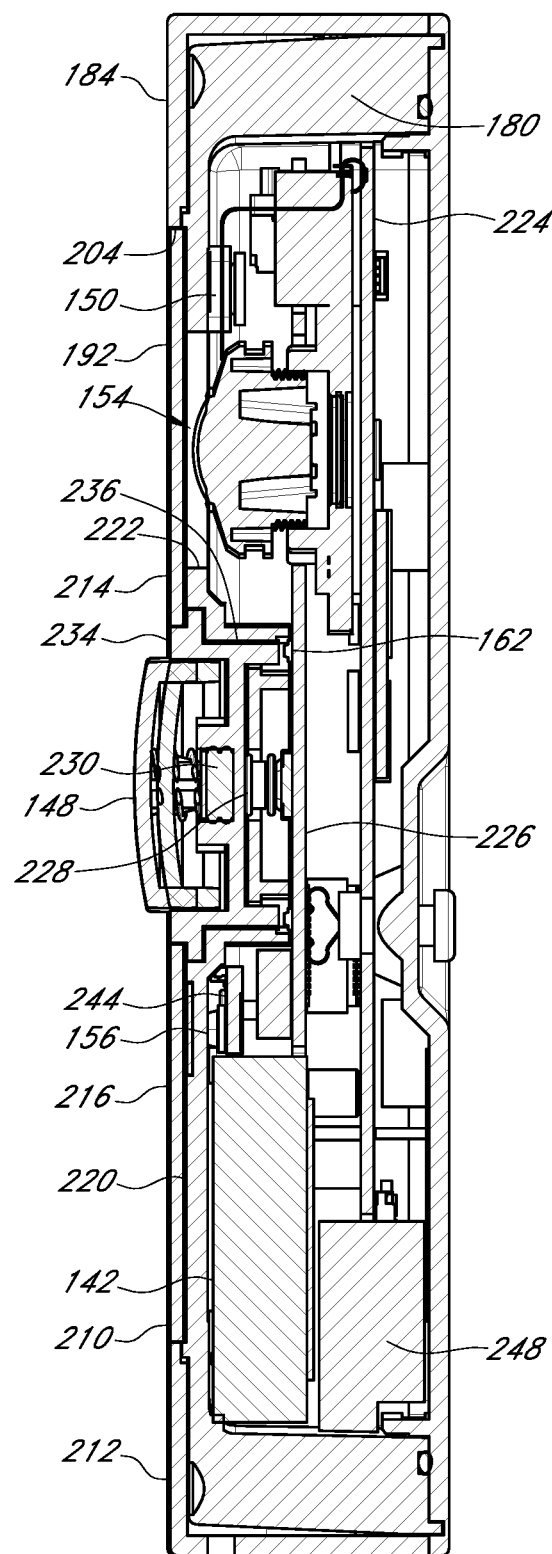
FIG. 10 is a right-side cross-sectional view of the A/V recording and communication doorbell of FIG. 4 taken through the line 10-10 in FIG. 4.

With further reference to FIG. 6, the shell 184 includes a central opening 204 in a front surface. The central opening 204 is sized and shaped to accommodate the shield 192. In the illustrated embodiment, the shield 192 is substantially rectangular, and includes a central opening 206 through which the front button 148 protrudes. The shield 192 defines a plane parallel to and in front of a front surface 208 of the enclosure 180. When the shell 184 is mated with the enclosure 180, as shown in FIGS. 4 and 10, the shield 192 resides within the central opening 204 of the shell 184 such that a front surface 210 of the shield 192 is substantially flush with a front surface 212 of the shell 184 and there is little or no gap (FIG. 4) between the outer edges of the shield 192 and the inner edges of the central opening 204 in the shell 184.

With further reference to FIG. 6, the shield 192 includes an upper portion 214 (located above and to the sides of the front button 148) and a lower portion 216 (located below and to the sides of the front button 148). The upper and lower portions 214, 216 of the shield 192 may be separate pieces, and may comprise different materials. The upper portion 214 of the shield 192 may be transparent or translucent so that it does not interfere with the field of view of the camera 154. For example, in certain embodiments the upper portion 214 of the shield 192 may comprise glass or plastic. As described in detail below, the microphone 150, which is operatively connected to the processor 160, is located behind the upper portion 214 of the shield 192. The upper portion 214, therefore, may include an opening 218 that facilitates the passage of sound through the shield 192 so that the microphone 150 is better able to pick up sounds from the area around the A/V recording and communication doorbell 130.

The lower portion 216 of the shield 192 may comprise a material that is substantially transparent to infrared (IR) light, but partially or mostly opaque with respect to light in the visible spectrum. For example, in certain embodiments the lower portion 216 of the shield 192 may comprise a plastic, such as polycarbonate. The lower portion 216 of the shield 192, therefore, does not interfere with transmission of IR light from the IR light source 156, which is located behind the lower portion 216. As described in detail below, the IR light source 156 and the IR cut filter 158, which are both operatively connected to the processor 160, facilitate "night vision" functionality of the camera 154.

The upper portion 214 and/or the lower portion 216 of the shield 192 may abut an underlying cover 220 (FIG. 10), which may be integral with the enclosure 180 or may be a separate piece. The cover 220, which may be opaque, may include a first opening 222 corresponding to the location of the camera 154, a second opening (not shown) corresponding to the location of the microphone 150 and the opening 218 in the upper portion 214 of the shield 192, and a third opening (not shown) corresponding to the location of the IR light source 156.

Figure 7:
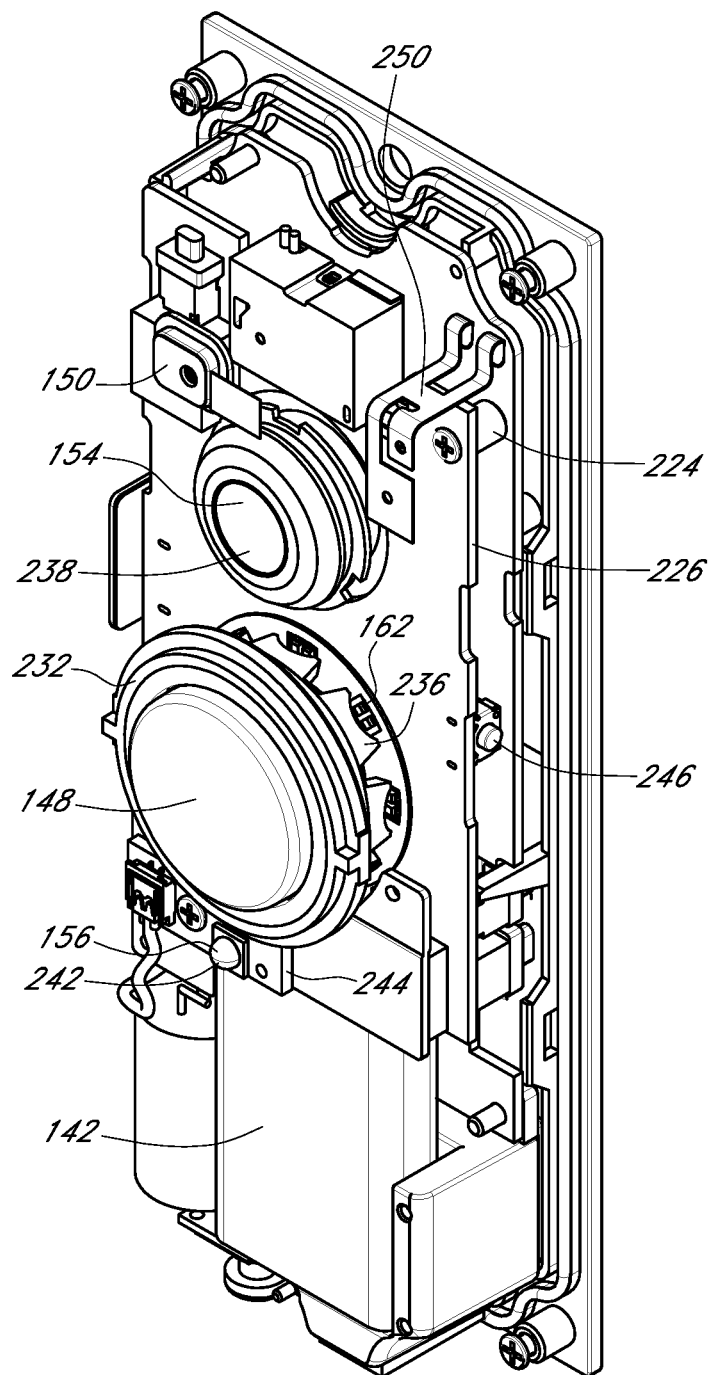
FIGS. 7, 8, and 9 are front perspective views of various internal components of the A/V recording and communication doorbell of FIG. 4.
Figure 8:
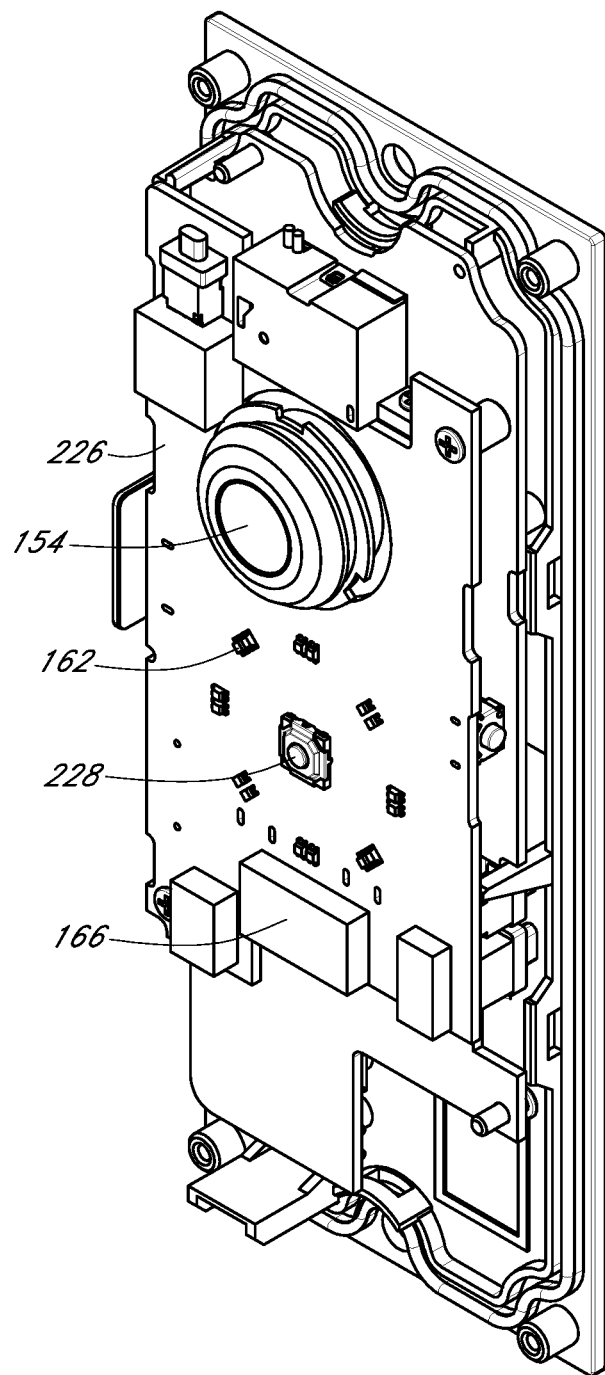
Figure 9:
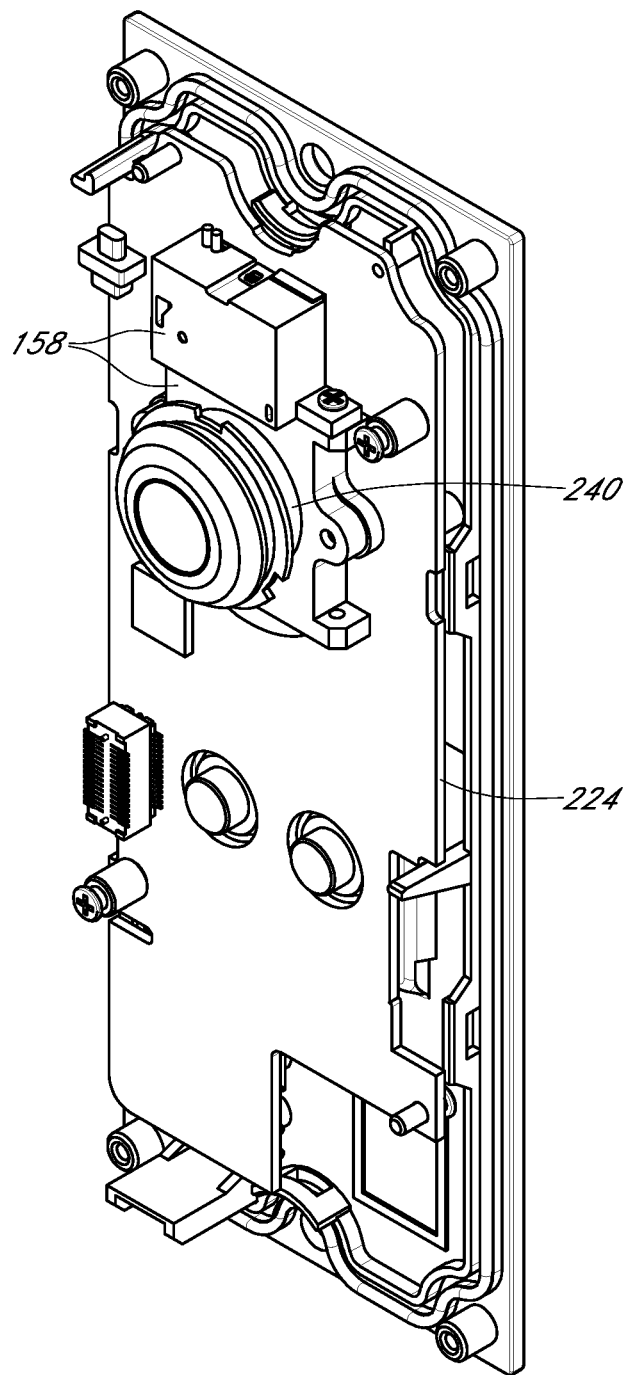

FIGS. 7-10 illustrate various internal components of the A/V recording and communication doorbell 130. FIGS. 7-9 are front perspective views of the doorbell 130 with the shell 184 and the enclosure 180 removed, while FIG. 10 is a right-side cross-sectional view of the doorbell 130 taken through the line 10-10 in FIG. 4. With reference to FIGS. 7 and 8, the A/V recording and communication doorbell 130 further comprises a main printed circuit board (PCB) 224 and a front PCB 226. With reference to FIG. 8, the front PCB 226 comprises a button actuator 228. With reference to FIGS. 7, 8, and 10, the front button 148 is located in front of the button actuator 228. The front button 148 includes a stem 230 (FIG. 10) that extends into the housing 178 to contact the button actuator 228. When the front button 148 is pressed, the stem 230 depresses the button actuator 228, thereby closing the electronic switch 166 (FIG. 8), as described below.

With reference to FIG. 8, the front PCB 226 further comprises the light indicators 162, which may illuminate when the front button 148 of the doorbell 130 is pressed. In the illustrated embodiment, the light indicators 162 comprise light-emitting diodes (LEDs 162) that are surface mounted to the front surface of the front PCB 226 and are arranged in a circle around the button actuator 228. The present embodiments are not limited to the light indicators 162 being LEDs, and in alternative embodiments the light indicators 162 may comprise any other type of light-emitting device. The present embodiments are also not limited by the number of light indicators 162 shown in FIG. 8, nor by the pattern in which they are arranged.

With reference to FIG. 7, the doorbell 130 further comprises a light pipe 232. The light pipe 232 is a transparent or translucent ring that encircles the front button 148. With reference to FIG. 4, the light pipe 232 resides in an annular space between the front button 148 and the central opening 206 in the shield 192, with a front surface 234 of the light pipe 232 being substantially flush with the front surface 210 of the shield 192. With reference to FIGS. 7 and 10, a rear portion of light pipe 232 includes a plurality of posts 236 whose positions correspond to the positions of the LEDs 162. When the LEDs 162 are illuminated, light is transmitted through the posts 236 and the body of the light pipe 232 so that the light is visible at the front surface 234 of the light pipe 232. The LEDs 162 and the light pipe 232 thus provide a ring of illumination around the front button 148. The light pipe 232 may comprise a plastic, for example, or any other suitable material capable of transmitting light.

The LEDs 162 and the light pipe 232 may function as visual indicators for a visitor and/or a user. For example, the LEDs 162 may illuminate upon activation or stay illuminated continuously. In one aspect, the LEDs 162 may change color to indicate that the front button 148 has been pressed. The LEDs 162 may also indicate that the battery 142 needs recharging, or that the battery 142 is currently being charged, or that charging of the battery 142 has been completed. The LEDs 162 may indicate that a connection to the user's network is good, limited, poor, or not connected. The LEDs 162 may be used to guide the user through setup or installation steps using visual cues, potentially coupled with audio cues emitted from the speaker 152.

With further reference to FIG. 7, the A/V recording and communication doorbell 130 further comprises a rechargeable battery 142. As described in further detail below, the A/V recording and communication doorbell 130 is connected to an external power source 134 (FIG. 3), such as AC mains. The A/V recording and communication doorbell 130 is primarily powered by the external power source 134, but may also draw power from the rechargeable battery 142 so as not to exceed a threshold amount of power from the external power source 134, to thereby avoid inadvertently sounding the signaling device 168. With reference to FIG. 3, the battery 142 is operatively connected to the power manager 140. As described below, the power manager 140 controls an amount of power drawn from the battery 142 to supplement the power drawn from the external AC power source 134 to power the A/V recording and communication doorbell 130 when supplemental power is needed. The power manager 140 also controls recharging of the battery 142 using power drawn from the external power source 134. The battery 142 may comprise, for example, a lithium-ion battery, or any other type of rechargeable battery.

With further reference to FIG. 7, the A/V recording and communication doorbell 130 further comprises the camera 154. The camera 154 is coupled to a front surface of the front PCB 226, and includes a lens 238 and an imaging processor 240 (FIG. 9). The camera lens 238 may be a lens capable of focusing light into the camera 154 so that clear images may be captured. The camera 154 may comprise, for example, a high definition (HD) video camera, such as one capable of capturing video images at an image display resolution of 720p or better. In certain of the present embodiments, the camera 154 may be used to detect motion within its field of view, as described below.

With further reference to FIG. 7, the A/V recording and communication doorbell 130 further comprises an infrared (IR) light source 242. In the illustrated embodiment, the IR light source 242 comprises an IR light-emitting diode (LED) 242 coupled to an IR LED printed circuit board (PCB) 244. In alternative embodiments, the IR LED 242 may not comprise a separate PCB 244, and may, for example, be coupled to the front PCB 226.

With reference to FIGS. 7 and 10, the IR LED PCB 244 is located below the front button 148 (FIG. 7) and behind the lower portion 216 of the shield 192 (FIG. 10). As described above, the lower portion 216 of the shield 192 is transparent to IR light, but may be opaque with respect to light in the visible spectrum.

The IR LED 242 may be triggered to activate when a low level of ambient light is detected. When activated, IR light emitted from the IR LED 242 illuminates the camera 154's field of view. The camera 154, which may be configured to detect IR light, may then capture the IR light emitted by the IR LED 242 as it reflects off objects within the camera 154's field of view, so that the A/V recording and communication doorbell 130 can clearly capture images at night (may be referred to as "night vision").

With reference to FIG. 9, the A/V recording and communication doorbell 130 further comprises an IR cut filter 158. The IR cut filter 158 is a mechanical shutter that can be selectively positioned between the lens 238 and the image sensor of the camera 154. During daylight hours, or whenever there is a sufficient amount of ambient light, the IR cut filter 158 is positioned between the lens 238 and the image sensor so to filter out IR light so that it does not distort the colors of images as the human eye sees them. During nighttime hours, or whenever there is little to no ambient light, the IR cut filter 158 is withdrawn from the space between the lens 238 and the image sensor, so that the camera 154 is sensitive to IR light ("night vision"). In some embodiments, the camera 154 acts as a light detector for use in controlling the current state of the IR cut filter 158 and turning the IR LED 242 on and off. Using the camera 154 as a light detector is facilitated in some embodiments by the fact that the A/V recording and communication doorbell 130 is powered by a connection to AC mains, and the camera 154, therefore, is always powered on. In other embodiments, however, the A/V recording and communication doorbell 130 may include a light sensor separate from the camera 154 for use in controlling the IR cut filter 158 and the IR LED 242.

With reference back to FIG. 6, the A/V recording and communication doorbell 130 further comprises a reset button 170. The reset button 170 contacts a reset button actuator 246 (FIG. 7) coupled to the front PCB 226. When the reset button 170 is pressed, it may contact the reset button actuator 246, which may trigger the erasing of any data stored at the non-volatile memory 174 and/or at the memory 172 (FIG. 3), and/or may trigger a reboot of the processor 160.

Figure 11:
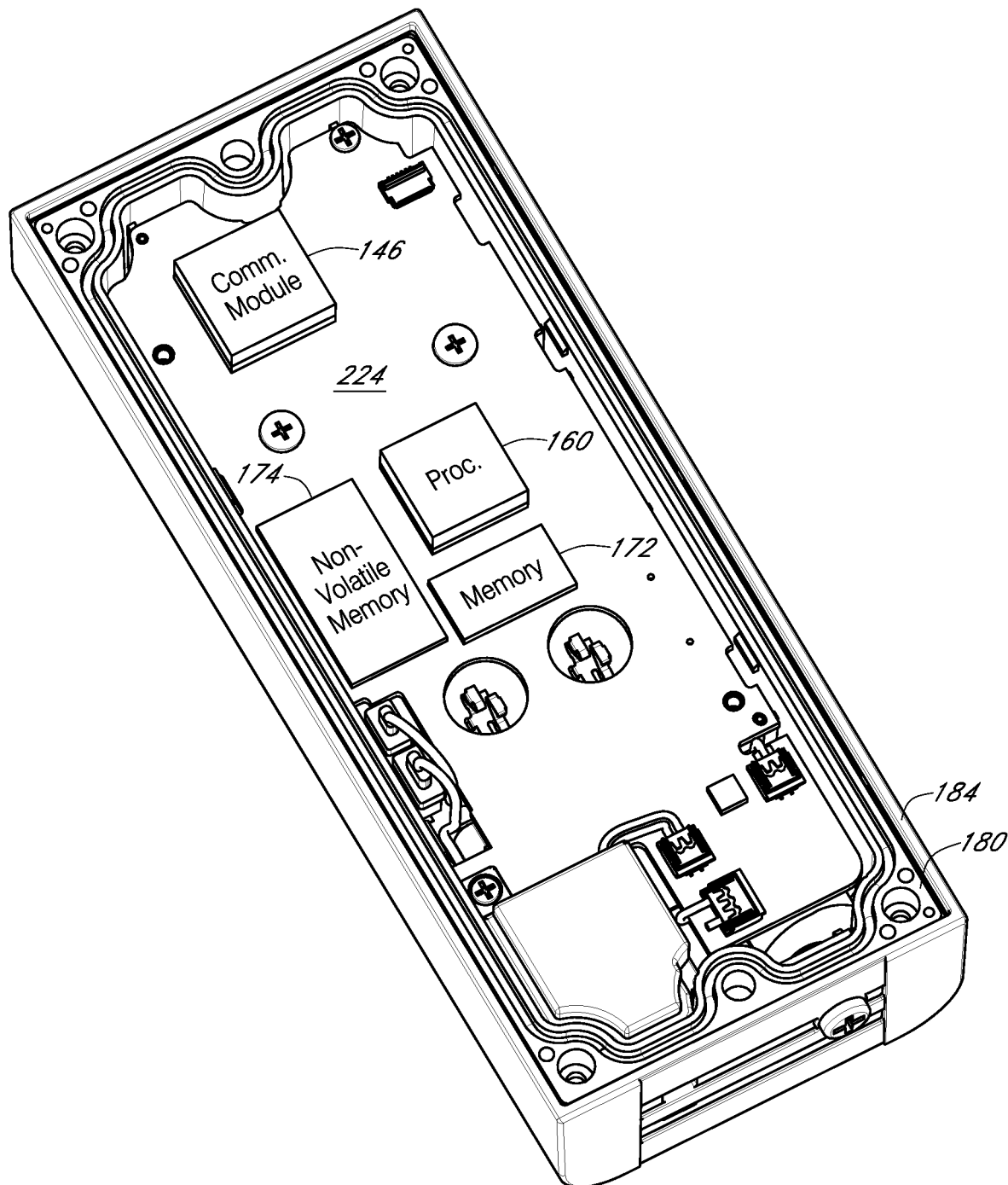
FIGS. 11-13 are rear perspective views of various internal components of the A/V recording and communication doorbell of FIG. 4.
Figure 12:
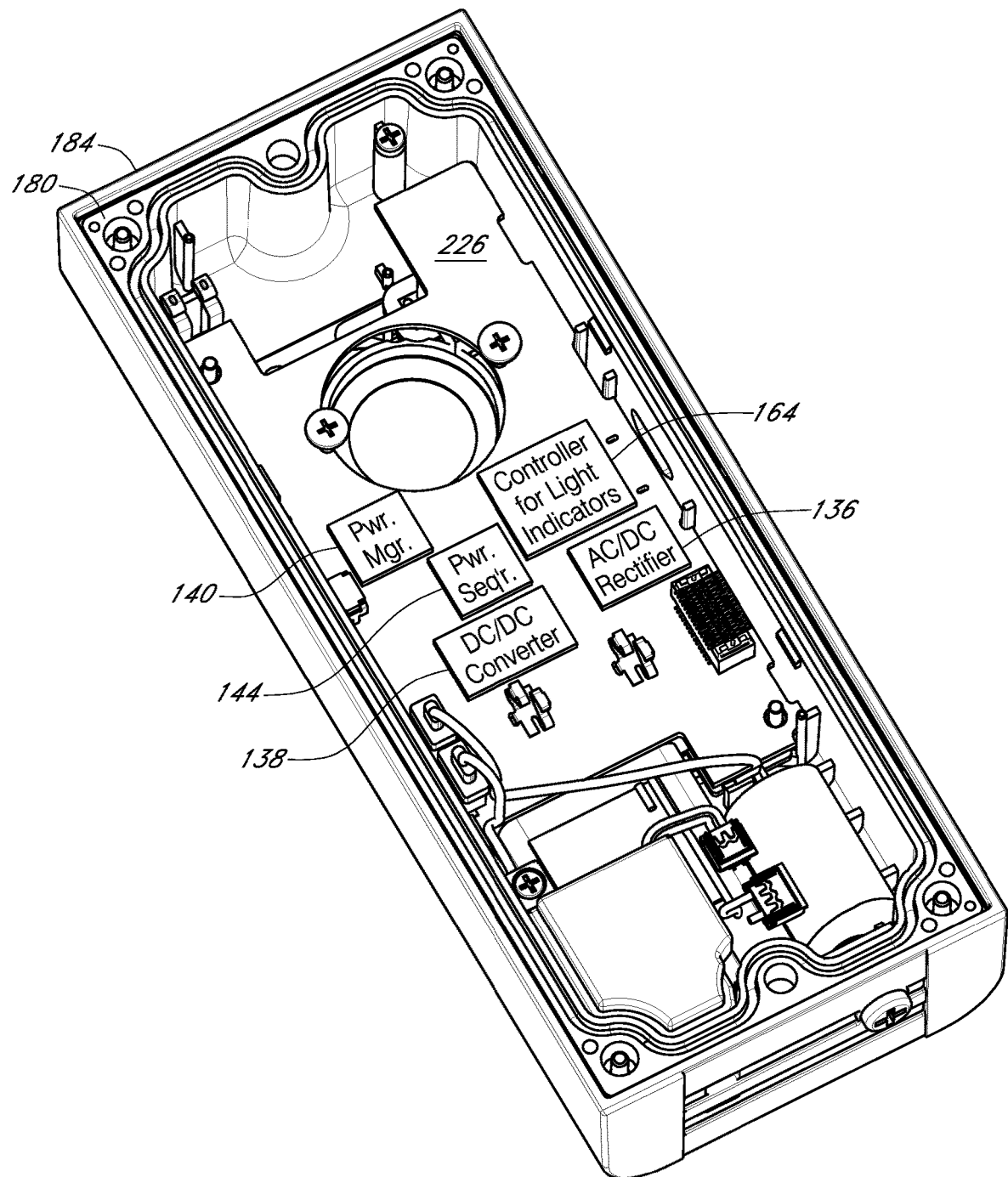
Figure 13:
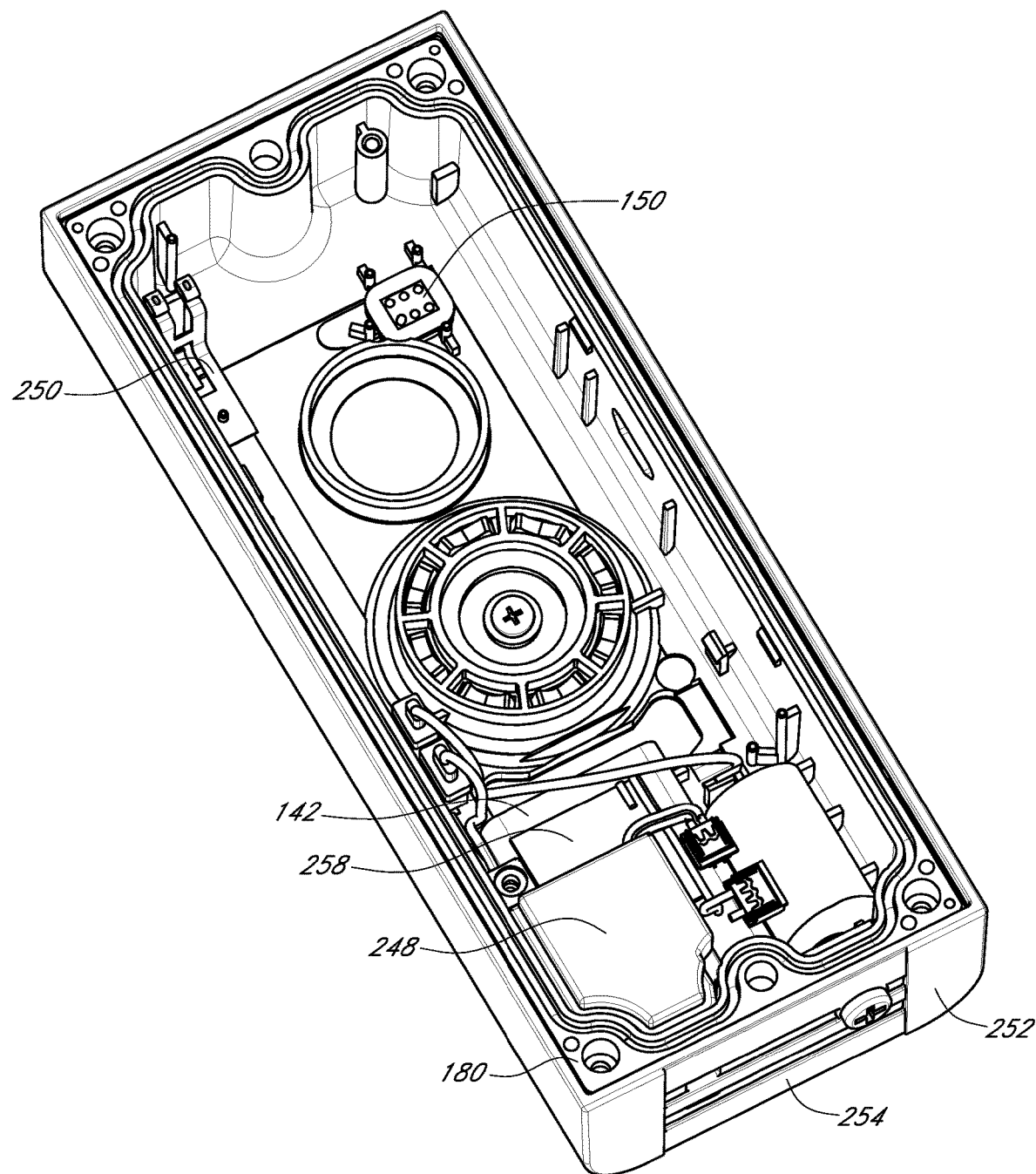

FIGS. 11-13 further illustrate internal components of the A/V recording and communication doorbell 130. FIGS. 11-13 are rear perspective views of the doorbell 130 with the back plate 182 and additional components removed. For example, in FIG. 11 the back plate 182 is removed, while in FIG. 12 the back plate 182 and the main PCB 224 are removed, and in FIG. 13 the back plate 182, the main PCB 224, and the front PCB 226 are removed. With reference to FIG. 11, several components are coupled to the rear surface of the main PCB 224, including the communication module 146, the processor 160, memory 172, and non-volatile memory 174. The functions of each of these components are described below. With reference to FIG. 12, several components are coupled to the rear surface of the front PCB 226, including the power manager 140, the power sequencer 144, the AC/DC rectifier 136, the DC/DC converter 138, and the controller 164 for the light indicators 162. The functions of each of these components are also described below. With reference to FIG. 13, several components are visible within the enclosure 180, including the microphone 150, a speaker chamber 248 (in which the speaker 152 is located), and an antenna 250 for the communication module 146. The functions of each of these components are also described below.

With reference to FIG. 7, the antenna 250 is coupled to the front surface of the main PCB 224 and operatively connected to the communication module 146, which is coupled to the rear surface of the main PCB 224 (FIG. 11). The microphone 150, which may also be coupled to the front surface of the main PCB 224, is located near the opening 218 (FIG. 4) in the upper portion 214 of the shield 192 so that sounds emanating from the area around the A/V recording and communication doorbell 130 can pass through the opening 218 and be detected by the microphone 150. With reference to FIG. 13, the speaker chamber 248 is located near the bottom of the enclosure 180. The speaker chamber 248 comprises a hollow enclosure in which the speaker 152 is located. The hollow speaker chamber 248 amplifies the sounds made by the speaker 152 so that they can be better heard by a visitor in the area near the A/V recording and communication doorbell 130. With reference to FIGS. 5 and 13, the lower surface 252 of the shell 184 and the lower surface (not shown) of the enclosure 180 may include an acoustical opening 254 through which the sounds made by the speaker 152 can pass so that they can be better heard by a visitor in the area near the A/V recording and communication doorbell 130. In the illustrated embodiment, the acoustical opening 254 is shaped generally as a rectangle having a length extending substantially across the lower surface 252 of the shell 184 (and also the enclosure 180). The illustrated shape is, however, just one example. With reference to FIG. 5, the lower surface 252 of the shell 184 may further include an opening 256 for receiving a security screw (not shown). The security screw may extend through the opening 256 and into a similarly located opening in the enclosure 180 to secure the shell 184 to the enclosure 180. If the doorbell 130 is mounted to a mounting bracket (not shown), the security screw may also maintain the doorbell 130 on the mounting bracket.

With reference to FIG. 13, the A/V recording and communication doorbell 130 may further include a battery heater 258. The present A/V recording and communication doorbell 130 is configured for outdoor use, including in cold climates. Cold temperatures, however, can cause negative performance issues for rechargeable batteries, such as reduced energy capacity, increased internal resistance, reduced ability to charge without damage, and reduced ability to supply load current. The battery heater 258 helps to keep the rechargeable battery 142 warm in order to reduce or eliminate the foregoing negative performance issues. In the illustrated embodiment, the battery heater 258 comprises a substantially flat, thin sheet abutting a side surface of the rechargeable battery 142. The battery heater 258 may comprise, for example, an electrically resistive heating element that produces heat when electrical current is passed through it. The battery heater 258 may thus be operatively coupled to the power manager 140 and/or the power sequencer 144 (FIG. 12). In some embodiments, the rechargeable battery 142 may include a thermally sensitive resistor ("thermistor," not shown) operatively connected to the processor 160 so that the battery 142's temperature can be monitored and the amount of power supplied to the battery heater 258 can be adaptively controlled to keep the rechargeable battery 142 within a desired temperature range.

As described above, the present embodiments advantageously limit the power consumption of the A/V recording and communication doorbell to an amount that is below the threshold necessary for causing the signaling device to sound (except when the front button of the doorbell is pressed). The present A/V recording and communication doorbell can thus be connected to the existing household AC power supply and the existing signaling device without causing inadvertent sounding of the signaling device.

Several advantages flow from the ability of the present embodiments to be connected to the existing household AC power supply. For example, the camera of the present A/V recording and communication doorbell can be powered on continuously. In a typical battery-powered A/V recording and communication doorbell, the camera is powered on only part of the time so that the battery does not drain too rapidly. The present embodiments, by contrast, do not rely on a battery as a primary (or sole) power supply, and are thus able to keep the camera powered on continuously. Because the camera is able to be powered on continuously, it can always be recording, and recorded footage can be continuously stored in a rolling buffer or sliding window. In some embodiments, about 10-15 seconds of recorded footage can be continuously stored in the rolling buffer or sliding window. Also, because the camera is able to be powered on continuously, it can be used for motion detection, thus eliminating any need for a separate motion detection device, such as a passive infrared sensor (PIR). Eliminating the PIR simplifies the design of the A/V recording and communication doorbell and enables the doorbell to be made more compact, although in some alternative embodiments the doorbell may include one or more PIRs. Also, because the camera is able to be powered on continuously, it can be used as a light detector for use in controlling the current state of the IR cut filter and turning the IR LED on and off. Using the camera as a light detector eliminates any need for a separate light detector, thereby further simplifying the design of the A/V recording and communication doorbell and enabling the doorbell to be made even more compact, although in some alternative embodiments the doorbell may include a separate light detector.

One aspect of the present embodiments includes the realization that in current audio/video (A/V) recording and communication devices (e.g., doorbells) other than the present embodiments, streaming video that is sent from the A/V recording and communication device to the user's client device does not include any images of events that took place prior to the event that triggered the sending of the streaming video. For example, when the A/V recording and communication device detects an event, such as motion in the area about the A/V recording and communication device or a visitor pressing the front button of the A/V recording and communication device (when the A/V recording and communication device is a doorbell), the streaming video that is sent from the A/V recording and communication device to the user's client device begins at (or just after) the moment that the motion was detected or the front button was pressed. Often, however, the events that occurred just prior to the event detection are of interest to the user. The present embodiments solve this problem by continuously recording, with the camera of the A/V recording and communication device, the area within the field of view of the camera and then, when an event is detected, beginning the streaming video at a time that is prior to the event detection. The continuously recorded video images are stored in a rolling buffer, and the streaming video begins from the beginning of the rolling buffer. In order so that the streaming video can be presented to the user in real time, a beginning portion of the streaming video is read out of the rolling buffer and streamed to the user's client device at a rate that is higher than the rate at which the video image data is written to the rolling buffer. When the read operation catches up to the write operation, the read rate drops to match the write rate. The present embodiments thus advantageously enable the user to view video images of events that happened just prior to the detected event, thereby delivering more information to the user to help the user better understand what is taking place in the streaming video.

Figure 14:
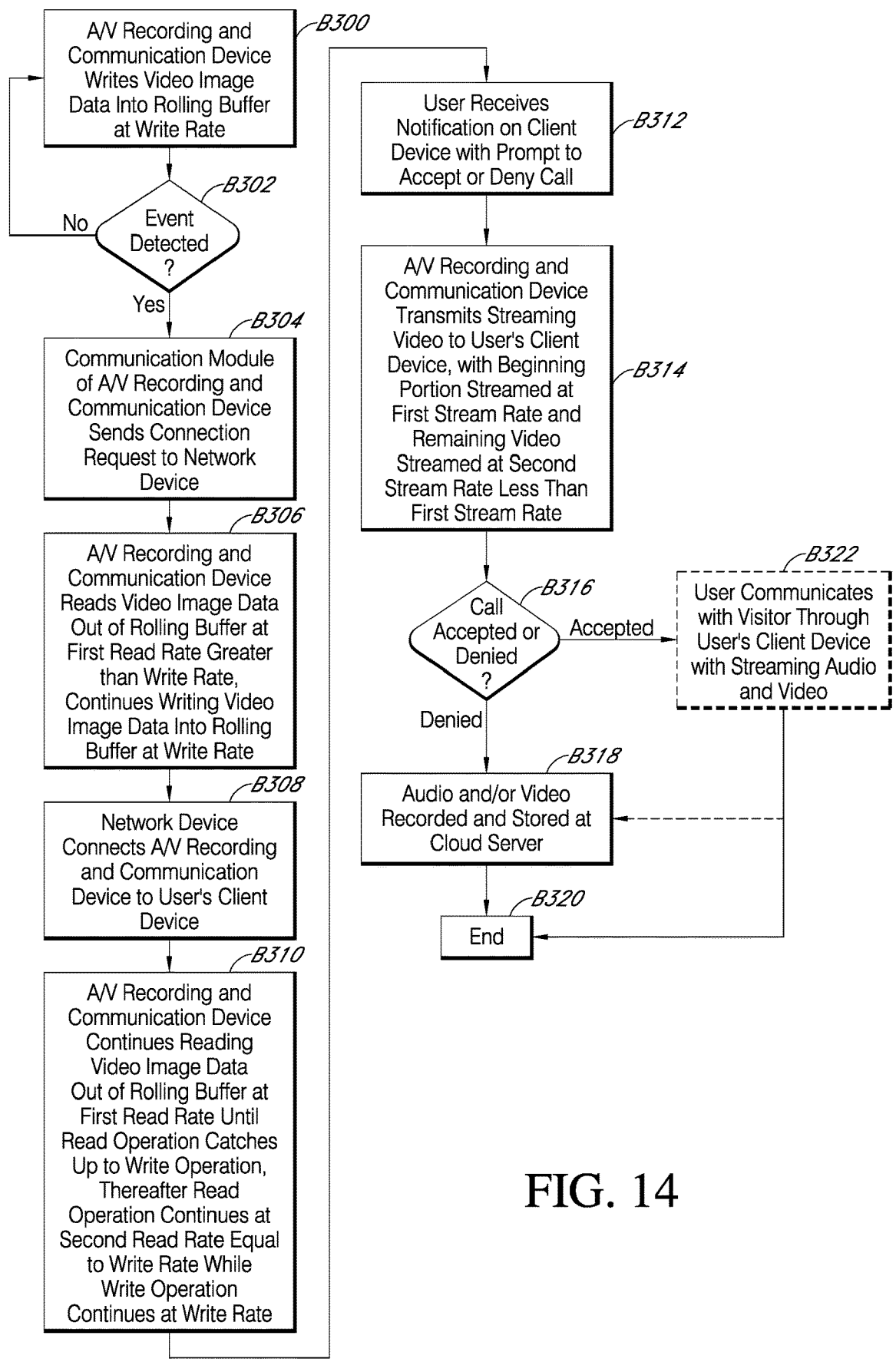
FIG. 14 is a flowchart illustrating one embodiment of a process for streaming and storing A/V content from an A/V recording and communication device according to various aspects of the present disclosure.

FIG. 14 is a flowchart illustrating a process for streaming and storing A/V content from an A/V recording and communication device according to various aspects of the present disclosure. The method comprises, at block B300, recording, with the camera, video image data of an area about the A/V recording and communication device and writing the video image data into the memory at a write rate. In some embodiments, the processor may execute a write operation to write the video image data into the memory at the write rate. In one non-limiting example, the write rate may be 30 frames per second. The present embodiments are not limited to any value of the write rate, and in other non-limiting examples the write rate may be, for example, 5 frames per second (fps), or 10 fps, or 15 fps, or 20 fps, or 25 fps, or 35 fps, or 40 fps, or 45 fps, or 50 fps, or 55 fps, or 60 fps, etc.

Figure 15:
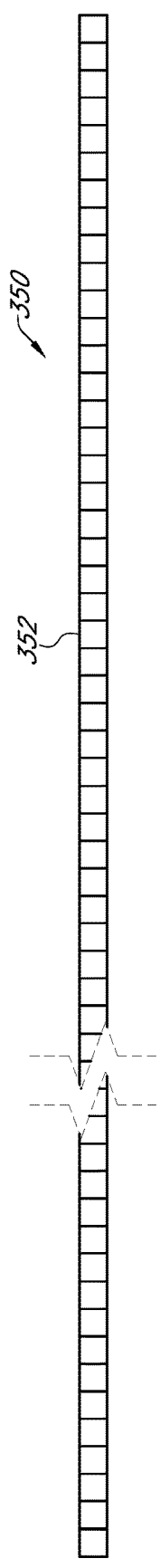
FIGS. 15-21 are schematic diagrams of a computer memory illustrating one embodiment of a write/read process according to various aspects of the present disclosure.
Figure 16:
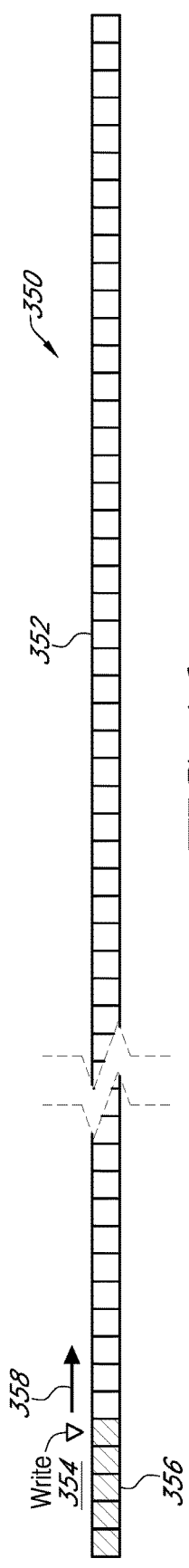

In some embodiments, the memory into which the video image data is written comprises a rolling buffer. A rolling buffer, which may also be referred to as a circular buffer, a circular queue, a cyclic buffer, or a ring buffer, is a data structure that uses a single, fixed-size buffer as if it were connected end-to-end. FIG. 15 is a schematic diagram of a rolling buffer 350. The rolling buffer 350, which may comprise at least a portion of the memory 172 (FIG. 3), includes a plurality of segments or blocks 352. In the initial state of FIG. 15, which may correspond to the A/V recording and communication device 130 being in a powered-down state, each of the blocks 352 may be empty. When the A/V recording and communication device 130 is powered up, the camera 154 begins recording video image data of the area within its field of view. The video image data is written into the rolling buffer 350 by a write operation 354, which may be executed by the processor 160, for example. With reference to FIG. 16, as the write operation 354 proceeds, each of the blocks 352 of the rolling buffer 350 receives and stores a portion of the video image data, as represented by the patterned blocks 356 to the left of the write operation 354. In the illustrated embodiment, the write operation 354 begins at the left side of the rolling buffer 350 and proceeds from left to right, as indicated by the arrow 358. The illustrated example is, however, not limiting and not intended to be representative of the actual physical layout of the rolling buffer 350.

In some embodiments, each block 352 of the rolling buffer 350 may correspond to one frame of video image data. That is, each block 352 may store one video frame, and the blocks 352 may be referred to interchangeably as frames. Thus, a size of each block 352 may correspond to a size of each video frame. In some embodiments, the size of each block 352 may vary. That is, some blocks 352 may be larger or smaller than other blocks 352.

Figure 17:
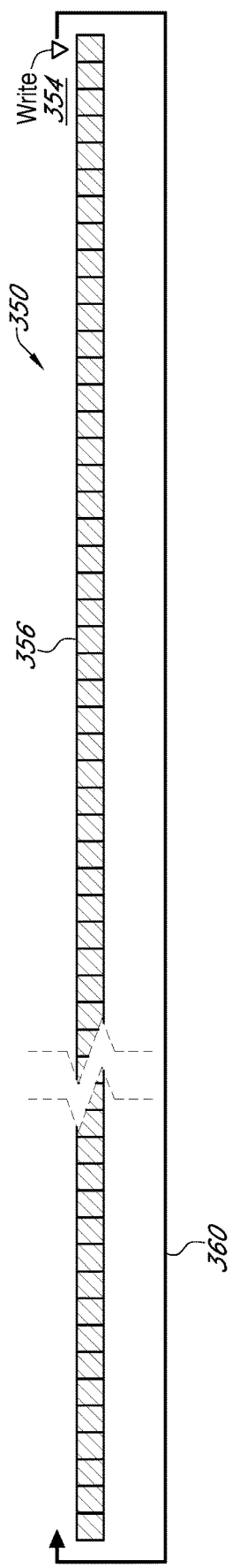

As the write operation 354 continues, more and more blocks 352 receive and store the video image data. With reference to FIG. 17, eventually the rolling buffer 350 is completely filled with the video image data, as represented by the patterned blocks 356. The write operation 354 then continues at the beginning of the rolling buffer 350, as indicated by the return arrow 360 in FIG. 17. As the write operation 354 continues, the old video image data in each block 356 is overwritten with new video image data. This process may be repeated any number of times. The size of the rolling buffer 350 may be determined by a desired amount of video image data to be stored. For example, in some embodiments the rolling buffer 350 may have sufficient size to store 5 seconds of video image data, or 10 seconds of video image data, or 15 seconds of video image data, or 20 seconds of video image data, or any other amount of video image data.

With reference back to FIG. 14, at block B302 the process determines whether an event has been detected in the area about the A/V recording and communication device 130. This determination may be made while the write operation 354 continues writing the video image data into the rolling buffer 350. In some embodiments, the determination may be made by the processor 160. For example, the processor 160 may receive an input from the camera 154 (and/or from a separate motion sensor) indicative of motion within the field of view of the camera 154. In another example, the processor 160 may receive an input from the front button 148 indicating that the front button 148 has been pressed.

If no event is detected at block B302, then the process returns to block B300 and continues writing the video image data into the rolling buffer 350. If, however, an event is detected at block B302, then the process moves to block B304, where the communication module 146 sends a connection request to a device in the network 112. This aspect may be similar to, or the same as, that described above with reference to block B202 of FIG. 3. At block B306, a read operation begins to read the video image data out of the rolling buffer 350. In some embodiments, the read operation may be executed by the processor 160, for example.

Figure 18:
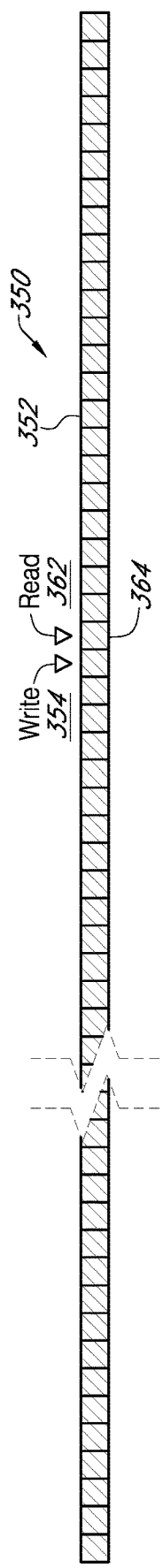

FIG. 18 illustrates the beginning of the read operation 362. The read operation 362 begins at the beginning of the rolling buffer 350, which in some embodiments may be whichever buffer block 352/356 contains the oldest video image data. Again, in the example illustrated in FIGS. 15-21 the write operation 354 moves through the rolling buffer 350 from left to right. Therefore, if all buffer blocks 352 contain video image data, then the oldest video image data is stored in whichever buffer block is just ahead of the write operation 354, which in FIG. 18 is the buffer block 364 just to the right of the write operation 354. This buffer block 364 is the "beginning" of the rolling buffer 350, and is where the read operation 362 begins. Because the write operation 354 is continuous as long as the camera is on, the location of the "beginning" of the rolling buffer 350 is constantly changing.

In the present embodiments, the read operation 362 may begin at a first read rate that is greater than the write rate. This aspect enables the read operation 362 to catch up to the write operation 354, so that when the read operation 362 catches up to the write operation 354 the streaming video is real time (e.g., little to no delay between events happening within the field of view of the camera 154 and those events being depicted on the display of the user's client device 114). In some embodiments, the first read rate may be a multiple of the write rate that is greater than one. In some non-limiting examples, the first read rate may be 1.1× the write rate, or 1.2× the write rate, or 1.3× the write rate, or 1.4× the write rate, or 1.5× the write rate, or 2× the write rate, or 2.5× the write rate, or 3× the write rate, etc. While the read operation 362 commences, the write operation 354 may continue to write the video image data into the rolling buffer 350 at the write rate.

With reference back to FIG. 14, at block B308 the process continues with the network device (which may be the server 118 or the backend API 120, for example) connecting the A/V recording and communication device 130 to the user's client device 114 through the user's network 110 and the network 112. This aspect may be similar to, or the same as, that described above with reference to block B204 of FIG. 3. The process then moves to block B310, where the read operation 362 continues to read the video image data out of the rolling buffer 350 at the first read rate until the read operation 362 catches up to the write operation 354. After the read operation 362 catches up to the write operation 354, the read operation 362 continues to read the video image data out of the rolling buffer 350 at a second read rate that is equal to the write rate. Meanwhile, the write operation 354 continues to write the video image data into the rolling buffer 350 at the write rate.

Figure 19:
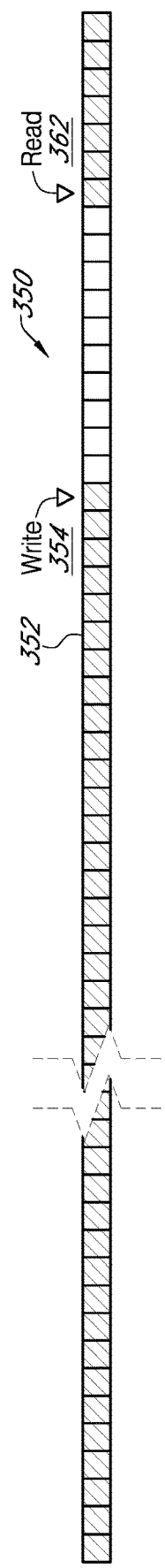
Figure 20:
Figure 21:
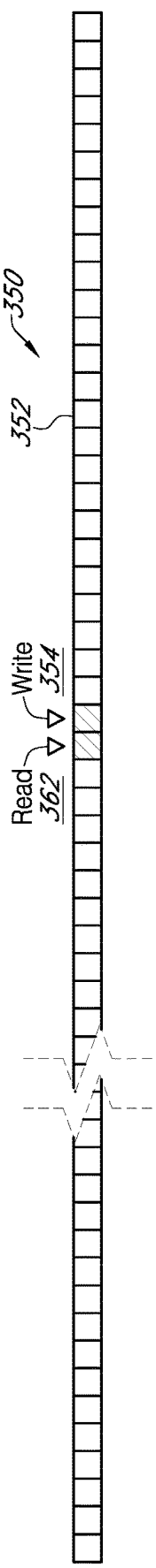

FIGS. 19-21 illustrate the read operation 362 and the write operation 354 continuing at different rates until the read operation 362 catches up to the write operation 354. With reference to FIG. 19, as the read operation 362 reads the video image data out of the rolling buffer 350 a separation appears between the read operation 362 and the write operation 354, as indicated by the spacing between the read operation 362 and the write operation 354 in FIG. 19 and by the empty blocks 352 of the rolling buffer 350 (these blocks 352 have had their video image data read out and the write operation 354 has not yet reached these blocks 352 to write new video image data into the empty blocks 352). With reference to FIG. 20, the separation between the read operation 362 and the write operation 354 continues to grow due to the read operation 362 progressing at a faster rate than the write operation 354. With reference to FIG. 21, eventually the read operation 362 catches up to the write operation 354 (e.g., the read operation 362 is one buffer block behind the write operation 354), at which point the rate of the read operation 362 drops to match the rate of the write operation 354.

With reference back to FIG. 14, at block B312 the process continues with the user receiving a notification on his or her client device 114 with a prompt to either accept or deny the call. This aspect may be similar to, or the same as, that described above with reference to block B210 of FIG. 3. The process then moves to block B314, where the A/V recording and communication device 130 transmits streaming video to the user's client device 114. In some embodiments, the communication module 146 may transmit the streaming video to the user's client device 114. A beginning portion of the streaming video may be streamed at a first stream rate and, thereafter, the streaming video may be streamed at a second stream rate that is less than the first stream rate. For example, the first stream rate may be equal to the first read rate and the second stream rate may be equal to the second read rate (which may be equal to the write rate). If the user is viewing the streaming video on the display of his or her client device 114, he or she will see the beginning portion of the streaming video displayed at the first stream rate, which may appear to the user that the video is being fast forwarded (proceeding at a rate that is faster than the rate at which the actual events occurred). After the "fast forwarded" beginning portion of the streaming video, the user will see the streaming video continue at what appears to be a normal speed (a rate that corresponds to the rate at which the actual events are occurring).

With reference back to FIG. 14, the process may continue with blocks B316, B318, B320, and B322. Each of these blocks corresponds to blocks B212, B214, B216, and B218, respectively, which are described above with reference to FIG. 2.

While the process of FIG. 14 describes only video image data that is written into and read out of the rolling buffer 350, the present embodiments contemplate that audio may also be incorporated into one or more processes. For example, the audio data captured by the microphone 150 of the A/V recording and communication device may also be written into and read out of the rolling buffer 350 in a process similar to that described with reference to FIG. 14. Alternatively, the audio data captured by the microphone 150 may be written into and read out of another memory, such as a different portion of the memory 172 or a memory location remote from the A/V recording and communication device.

As discussed below, the steps of the process of FIG. 14 need not be performed in the order presented, and may be performed in any order(s). For example, blocks B304 and B306 may be performed in the reverse order from that presented, or may be performed concurrently. In another example, blocks B310 and B312 may be performed in the reverse order from that presented, or may be performed concurrently.

As discussed above, the present disclosure provides numerous examples of methods and systems including A/V recording and communication doorbells, but the present embodiments are equally applicable for A/V recording and communication devices other than doorbells. For example, the present embodiments may include one or more A/V recording and communication security cameras instead of, or in addition to, one or more A/V recording and communication doorbells. An example A/V recording and communication security camera may include substantially all of the structure and functionality of the doorbell 130, but without the front button 148, the button actuator 228, and/or the light pipe 232.

Figure 22:
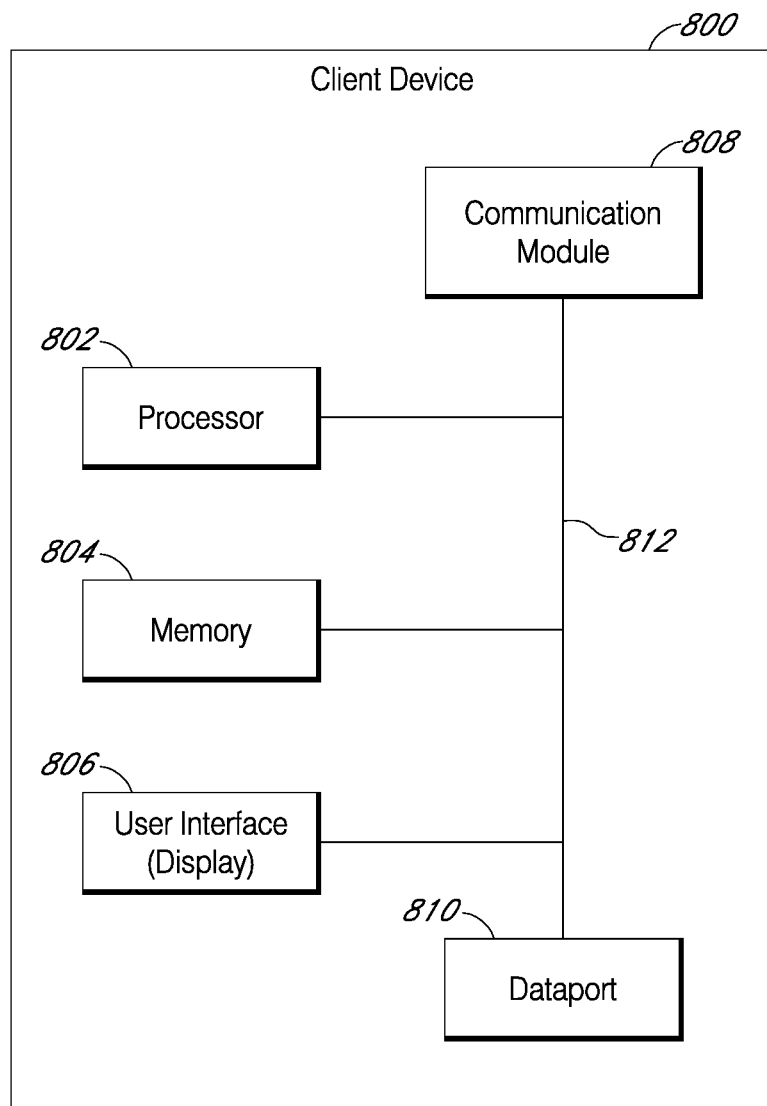
FIG. 22 is a functional block diagram of a client device on which the present embodiments may be implemented according to various aspects of the present disclosure.

FIG. 22 is a functional block diagram of a client device 800 on which the present embodiments may be implemented according to various aspects of the present disclosure. The user's client device 114 described with reference to FIG. 1 may include some or all of the components and/or functionality of the client device 800. The client device 800 may comprise, for example, a smartphone.

With reference to FIG. 22, the client device 800 includes a processor 802, a memory 804, a user interface 806, a communication module 808, and a dataport 810. These components are communicatively coupled together by an interconnect bus 812. The processor 802 may include any processor used in smartphones and/or portable computing devices, such as an ARM processor (a processor based on the RISC (reduced instruction set computer) architecture developed by Advanced RISC Machines (ARM).). In some embodiments, the processor 802 may include one or more other processors, such as one or more conventional microprocessors, and/or one or more supplementary co-processors, such as math co-processors.

The memory 804 may include both operating memory, such as random access memory (RAM), as well as data storage, such as read-only memory (ROM), hard drives, flash memory, or any other suitable memory/storage element. The memory 804 may include removable memory elements, such as a CompactFlash card, a MultiMediaCard (MMC), and/or a Secure Digital (SD) card. In some embodiments, the memory 804 may comprise a combination of magnetic, optical, and/or semiconductor memory, and may include, for example, RAM, ROM, flash drive, and/or a hard disk or drive. The processor 802 and the memory 804 each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 802 may be connected to the memory 804 via the dataport 810.

The user interface 806 may include any user interface or presentation elements suitable for a smartphone and/or a portable computing device, such as a keypad, a display screen, a touchscreen, a microphone, and a speaker. The communication module 808 is configured to handle communication links between the client device 800 and other, external devices or receivers, and to route incoming/outgoing data appropriately. For example, inbound data from the dataport 810 may be routed through the communication module 808 before being directed to the processor 802, and outbound data from the processor 802 may be routed through the communication module 808 before being directed to the dataport 810. The communication module 808 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 810 may be any type of connector used for physically interfacing with a smartphone and/or a portable computing device, such as a mini-USB port or an IPHONE®/IPOD® 30-pin connector or LIGHTNING® connector. In other embodiments, the dataport 810 may include multiple communication channels for simultaneous communication with, for example, other processors, servers, and/or client terminals.

The memory 804 may store instructions for communicating with other systems, such as a computer. The memory 804 may store, for example, a program (e.g., computer program code) adapted to direct the processor 802 in accordance with the present embodiments. The instructions also may include program elements, such as an operating system. While execution of sequences of instructions in the program causes the processor 802 to perform the process steps described herein, hard-wired circuitry may be used in place of, or in combination with, software/firmware instructions for implementation of the processes of the present embodiments. Thus, the present embodiments are not limited to any specific combination of hardware and software.

Figure 23:
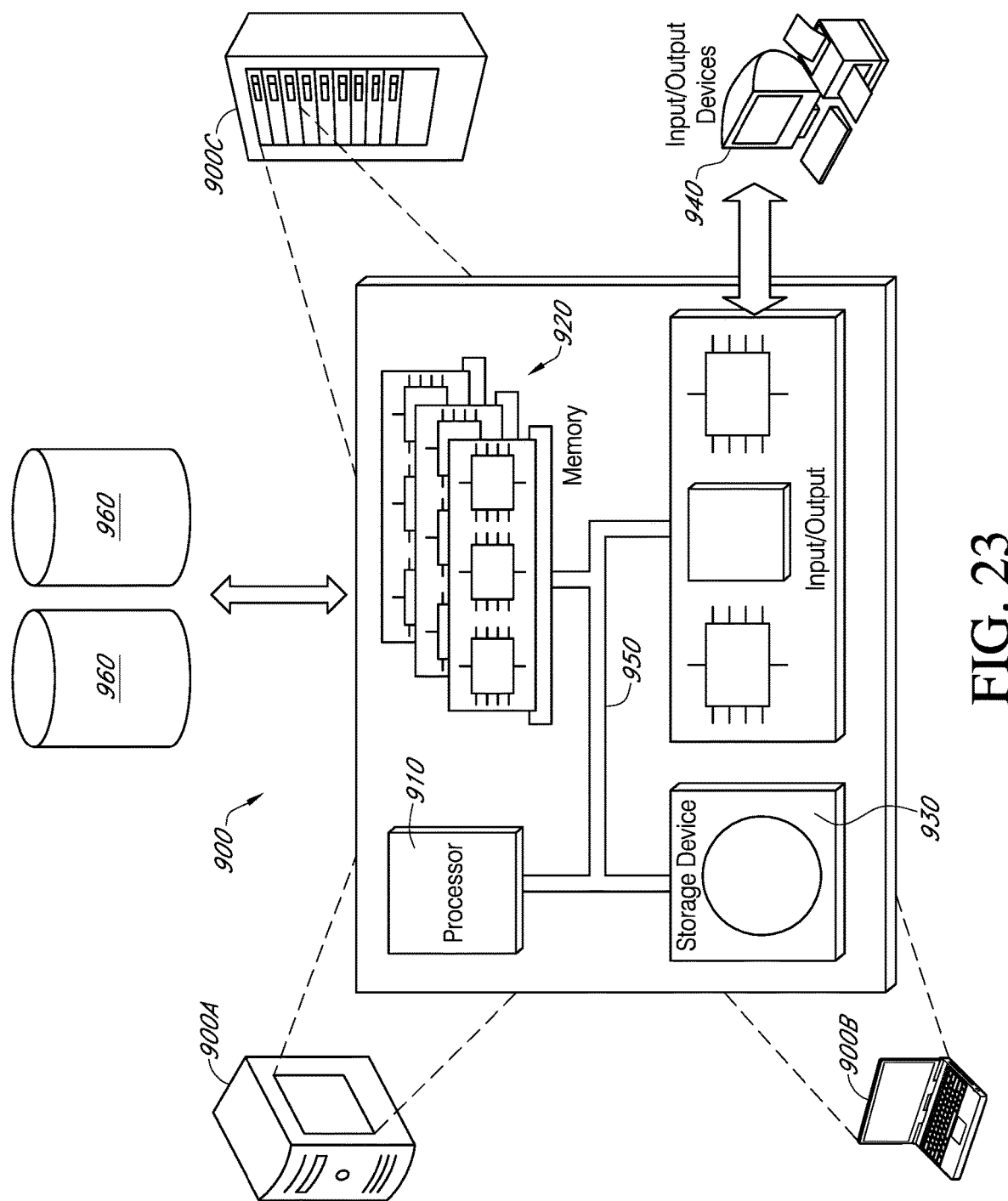
FIG. 23 is a functional block diagram of a general-purpose computing system on which the present embodiments may be implemented according to various aspects of present disclosure.

FIG. 23 is a functional block diagram of a general-purpose computing system on which the present embodiments may be implemented according to various aspects of present disclosure. The computer system 900 may execute at least some of the operations described above. The computer system 900 may be embodied in at least one of a personal computer (also referred to as a desktop computer) 900A, a portable computer (also referred to as a laptop or notebook computer) 900B, and/or a server 900C. A server is a computer program and/or a machine that waits for requests from other machines or software (clients) and responds to them. A server typically processes data. The purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 900 may include at least one processor 910, memory 920, at least one storage device 930, and input/output (I/O) devices 940. Some or all of the components 910, 920, 930, 940 may be interconnected via a system bus 950. The processor 910 may be single- or multi-threaded and may have one or more cores. The processor 910 may execute instructions, such as those stored in the memory 920 and/or in the storage device 930. Information may be received and output using one or more I/O devices 940.

The memory 920 may store information, and may be a computer-readable medium, such as volatile or non-volatile memory. The storage device(s) 930 may provide storage for the system 900, and may be a computer-readable medium. In various aspects, the storage device(s) 930 may be a flash memory device, a hard disk device, an optical disk device, a tape device, or any other type of storage device.

The I/O devices 940 may provide input/output operations for the system 900. The I/O devices 940 may include a keyboard, a pointing device, and/or a microphone. The I/O devices 940 may further include a display unit for displaying graphical user interfaces, a speaker, and/or a printer. External data may be stored in one or more accessible external databases 960.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

In a first aspect, a method for an audio/video (A/V) recording and communication device, the A/V recording and communication device including a camera, a processor, a memory, and a communication module is provided, the method comprising recording, with the camera, video image data of an area about the A/V recording and communication device, executing, by the processor, a write operation to write the video image data into the memory at a write rate, while writing the video image data into the memory, detecting an event in the area about the A/V recording and communication device, after detecting the event in the area about the A/V recording and communication device, executing, by the processor, a read operation to read the video image data out of the memory at a first read rate that is greater than the write rate, and the processor continuing to write the video image data into the memory at the write rate, the processor continuing to read the video image data out of the memory at the first read rate until the read operation catches up to the write operation, after the read operation catches up to the write operation, the processor reading the video image data out of the memory at a second read rate equal to the write rate, and the processor continuing to write the video image data into the memory at the write rate, and transmitting, by the communication module, streaming video to a client device, wherein a beginning portion of the streaming video is streamed at a first stream rate and thereafter the streaming video is streamed at a second stream rate less than the first stream rate.

In an embodiment of the first aspect, the first stream rate is equal to the first read rate and the second stream rate is equal to the second read rate.

In another embodiment of the first aspect, the memory comprises a rolling buffer.

In another embodiment of the first aspect, the read operation begins at a beginning of the rolling buffer.

In another embodiment of the first aspect, the rolling buffer comprises a plurality of blocks, and the beginning of the rolling buffer comprises whichever of the blocks contains an oldest portion of the video image data.

Another embodiment of the first aspect further comprises sending, with the communication module, a connection request to a network device.

In another embodiment of the first aspect, the A/V recording and communication device comprises a doorbell having a front button.

In another embodiment of the first aspect, detecting the event in the area about the A/V recording and communication device comprises detecting that the front button of the doorbell has been pressed.

In another embodiment of the first aspect, detecting the event in the area about the A/V recording and communication device comprises detecting motion.

In another embodiment of the first aspect, the A/V recording and communication device further comprises a speaker and a microphone.

In a second aspect, an audio/video (A/V) recording and communication device is provided, the device comprising a camera configured to record video image data of an area about the A/V recording and communication device, a memory, a communication module configured to transmit streaming video to a client device, and a processor, wherein the processor is configured to execute a write operation to write the video image data into the memory at a write rate, while writing the video image data into the memory, detect an event in the area about the A/V recording and communication device, after detecting the event in the area about the A/V recording and communication device, execute a read operation to read the video image data out of the memory at a first read rate that is greater than the write rate, and continue to write the video image data into the memory at the write rate, continue to read the video image data out of the memory at the first read rate until the read operation catches up to the write operation, and after the read operation catches up to the write operation, read the video image data out of the memory at a second read rate equal to the write rate, and continue to write the video image data into the memory at the write rate, wherein the communication module is configured to stream a beginning portion of the streaming video to the client device at a first stream rate and thereafter to stream the streaming video to the client device at a second stream rate less than the first stream rate.

In an embodiment of the second aspect, the first stream rate is equal to the first read rate and the second stream rate is equal to the second read rate.

In another embodiment of the second aspect, the memory comprises a rolling buffer.

In another embodiment of the second aspect, the read operation begins at a beginning of the rolling buffer.

In another embodiment of the second aspect, the rolling buffer comprises a plurality of blocks, and the beginning of the rolling buffer comprises whichever of the blocks contains an oldest portion of the video image data.

In another embodiment of the second aspect, the communication module is further configured to send a connection request to a network device.

In another embodiment of the second aspect, the A/V recording and communication device comprises a doorbell having a front button.

In another embodiment of the second aspect, detecting the event in the area about the A/V recording and communication device comprises detecting that the front button of the doorbell has been pressed.

In another embodiment of the second aspect, detecting the event in the area about the A/V recording and communication device comprises detecting motion.

Another embodiment of the second aspect further comprises a speaker and a microphone.

In a third aspect, a method for an audio/video (A/V) recording and communication device (A/V device) is provided, the A/V device including a camera, a processor, a memory, and a communication module, the method comprising: recording, with the camera, video image data; executing, by the processor, a write operation to write the video image data into the memory at a write rate; while writing the video image data into the memory, detecting an event in an area about the A/V device; transmitting, by the communication module, a connection request to a network device to connect the A/V device to a client device and connecting, by the communication module, to the client device via the network device; executing, by the processor, a read operation to read the video image data out of the memory at a first read rate that is greater than the write rate, and the processor continuing to write the video image data into the memory at the write rate; the processor continuing to read the video image data out of the memory at the first read rate until the read operation catches up to the write operation; after the read operation catches up to the write operation, the processor reading the video image data out of the memory at a second read rate equal to the write rate, and the processor continuing to write the video image data into the memory at the write rate; transmitting, by the communication module, streaming video to the client device via the network device, wherein a beginning portion of the streaming video is streamed at a first stream rate and thereafter the streaming video is streamed at a second stream rate less than the first stream rate.

In an embodiment of the third aspect, the first stream rate is equal to the first read rate and the second stream rate is equal to the second read rate.

In another embodiment of the third aspect, the memory comprises a rolling buffer.

In another embodiment of the third aspect, the read operation begins at a beginning of the rolling buffer.

In another embodiment of the third aspect, the rolling buffer comprises a plurality of blocks, and the beginning of the rolling buffer comprises whichever of the plurality of blocks contains an oldest portion of the video image data.

In another embodiment of the third aspect, the network device is a server.

In another embodiment of the third aspect, the A/V device comprises a doorbell having a front button.

In another embodiment of the third aspect, detecting the event in the area about the A/V device comprises detecting that the front button of the doorbell has been pressed.

In another embodiment of the third aspect, detecting the event in the area about the A/V device comprises detecting motion using the camera.

In another embodiment of the third aspect, the A/V device further comprises a motion sensor and wherein detecting the event in the area about the A/V device comprises detecting motion using the motion sensor.

In a fourth aspect, an audio/video (AN) recording and communication device (A/V device) is provided, the A/V device comprising: a camera; a memory; a communication module configured to transmit streaming video to a client device via a network device; and a processor; wherein the processor is configured to: execute a write operation to write video image data recorded by the camera into the memory at a write rate; while writing the video image data into the memory, detect an event in an area about the A/V device; execute a read operation to read the video image data out of the memory at a first read rate that is greater than the write rate, and continue to write the video image data into the memory at the write rate; continue to read the video image data out of the memory at the first read rate until the read operation catches up to the write operation; and after the read operation catches up to the write operation, read the video image data out of the memory at a second read rate equal to the write rate, and continue to write the video image data into the memory at the write rate; wherein the communication module is configured to stream a beginning portion of the streaming video to the client device via the network device at a first stream rate and thereafter to stream the streaming video to the client device via the network device at a second stream rate less than the first stream rate.

In an embodiment of the fourth aspect, the first stream rate is equal to the first read rate and the second stream rate is equal to the second read rate.

In another embodiment of the fourth aspect, the memory comprises a rolling buffer.

In another embodiment of the fourth aspect, the read operation begins at a beginning of the rolling buffer.

In another embodiment of the fourth aspect, the rolling buffer comprises a plurality of blocks, and the beginning of the rolling buffer comprises whichever of the plurality of blocks contains an oldest portion of the video image data.

In another embodiment of the fourth aspect, detecting the event in the area about the A/V device comprises detecting motion using the camera.

In another embodiment of the fourth aspect, the A/V device further comprises a motion sensor and wherein detecting the event in the area about the A/V device comprises detecting motion using the motion sensor.

In another embodiment of the fourth aspect, the A/V device further comprises a microphone and the communication module is further configured to transmit streaming audio to the client device via the network device.

In another embodiment of the fourth aspect, the processor is further configured to: execute the write operation to write audio data recorded by the microphone into the memory at the write rate; execute the read operation to read the audio data out of the memory at the first read rate that is greater than the write rate, and continue to write the audio data into the memory at the write rate; continue to read the audio data out of the memory at the first read rate until the read operation catches up to the write operation; and after the read operation catches up to the write operation, read the audio data out of the memory at the second read rate equal to the write rate, and continue to write the audio data into the memory at the write rate.

In another embodiment of the fourth aspect, the communication module is further configured to stream a beginning portion of the streaming audio to the client device via the network device at the first stream rate and thereafter to stream the streaming audio to the client device via the network device at the second stream rate less than the first stream rate.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

What is claimed is:

1. A method comprising:
   generating first image data by an audio/video (A/V) recording and communication doorbell (A/V doorbell);
   writing the first image data into a memory of the A/V doorbell at a write rate;
   while writing the first image data into the memory, at least one of detecting motion or receiving an input;
   based at least in part on the at least one of detecting the motion or receiving the input, reading the first image data out of the memory at a first read rate that is greater than the write rate;
   transmitting the first image data to one or more devices;

while transmitting the first image data, generating second image by the A/V doorbell;
writing the second image data into the memory at the write rate;
reading the second image data out of the memory at the first read rate this is greater than the write rate;
transmitting the second image data to the one or more devices;
determining that a read operation has caught up to a write operation;
based at least in part on determining that the read operation has caught up to the write operation, generating third image data by the A/V doorbell;
writing the third image data into the memory at the write rate;
based at least in part on determining that the read operation catches up to the write operation, reading the third image data out of the memory at a second read rate that is equal to the write rate; and
transmitting the third image data to the one or more devices.

2. The method of claim 1, wherein:
transmitting the first image data to the one or more devices comprises
transmitting the first image data to the one or more devices at a first stream rate that is equal to the first read rate; and
transmitting the third image data to the one or more devices comprises
transmitting the third image data to the one or more devices at a second stream rate that is equal to the second read rate.

3. The method of claim 1, wherein the memory comprises a rolling buffer.

4. The method of claim 3, wherein reading the first image data comprises reading the first image data beginning at a beginning of the rolling buffer and at the first read rate.

5. The method of claim 1, wherein receiving the input comprises receiving the input using a button of the A/V doorbell.

6. The method of claim 1, wherein detecting the motion comprises detecting the motion using a camera of the A/V doorbell.

7. The method of claim 1, wherein detecting the motion comprises detecting the motion using a motion sensor of the A/V doorbell.

8. The method of claim 1, further comprising:
generating first audio data by the A/V doorbell;
writing the first audio data into the memory at the write rate;
after detecting the event, reading the first audio data out of the memory at the first read rate;
transmitting the first audio data to the one or more devices;
after determining that the read operation has caught up to the write operation, generating second audio data by the A/V doorbell;
writing the second audio data into the memory at the write rate;
reading the second audio data out of the memory at the second read rate; and
transmitting the second audio data to the network device.

9. The method of claim 1, wherein:
generating the first image data comprises generating, by the A/V doorbell, the first image data representing an object prior to the event being detected; and generating the third image data comprises generating, by the A/V doorbell, the third image data representing the object after the event is detected.

10. The method of claim 1, wherein:
the first image data represents an object prior to the event being detected by the A/V doorbell; and
the second image data represents the object after the event is detected by the A/V doorbell.

11. An audio/video (A/V) recording and communication doorbell (A/V doorbell), comprising:
a camera;
a communication device;
a processor; and
a memory storing a program comprising instructions that, when executed by the processor, cause the A/V doorbell to:
write first image data generated by the camera into the memory at a write rate;
while writing the first image data into the memory, detect an event;
read the first image data out of the memory at a first read rate that is greater than the write rate;
transmit, using the communication device, the first image data to one or more devices;
while transmitting the first image data, write second image data generated by the camera into the memory at the write rate;
read the second image data out of the memory at the first read rate;
transmit the second image data to the one or more devices;
determine that a read operation has caught up to a write operation;
write third image data generated by the camera into the memory at the write rate;
based at least in part on determining that the read operation has caught up to the write operation, read the third image data out of the memory at a second read rate that is equal to the write rate; and
transmit, using the communication device, the third image data to the one or more devices.

12. The A/V doorbell of claim 11, wherein the first image data is transmitted at a first stream rate that is equal to the first read rate and the third image data is transmitted at a second stream rate that is equal to the second read rate.

13. The A/V doorbell of claim 11, wherein the memory comprises a rolling buffer.

14. The A/V doorbell of claim 11, wherein detecting the event comprises detecting motion using the camera.

15. The A/V doorbell of claim 11, further comprising a motion sensor, and wherein detecting the event comprises detecting motion using the motion sensor.

16. The A/V doorbell of claim 11, further comprising a microphone, and wherein the program comprises further instructions that, when executed by the processor, further cause the A/V doorbell to transmit, using the communication device, first audio data generated by the microphone to the one or more devices.

17. The A/V doorbell of claim 16, wherein the program comprises further instructions that, when executed by the processor, further cause the A/V doorbell to:
write the first audio data recorded by the microphone into the memory at the write rate;
read the audio data out of the memory at the first read rate;
after the read operation has caught up to the write operation, write second audio data generated by the microphone into the memory at the write rate; and read the second audio data out of the memory at the second read rate.

18. The A/V doorbell of claim 17, wherein the first audio data is transmitted at a first stream rate and the program comprises further instructions that, when executed by the processor, further cause the A/V doorbell to transmit, using the communication device, the second audio data to the one or more devices at a second stream rate.

19. The A/V doorbell as recited in claim 11, further comprising at least one of:
   an input device;
   at least one speaker; or
   at least one motion sensor.

20. A method comprising:
   generating first image data by an audio/video (A/V) recording and communication device (A/V doorbell);
   writing the first image data into a memory of the A/V doorbell;
   while writing the first image data into the memory, detecting, by the A/V doorbell, an event;
   based at least in part on detecting the event, reading the first image data out of the memory at a first rate;
   transmitting the first image data to one or more devices at a second rate that is based at least in part on the first rate;
   while transmitting the first image data, generating second image data by the A/V doorbell;
   writing the second image into the memory;
   reading the second image data out of the memory at the first read rate;
   transmitting the second image data to the one or more devices at the second rate;
   determining that a read operation has caught up to a write operation;
   generating third image data by the A/V doorbell;
   writing the third image data into the memory;
   based at least in part on determining that the read operation has caught up to the write operation, reading the third image data out of the memory at a third rate that is less than the first rate; and
   transmitting the third image data to the network device at a fourth rate that is based at least in part on the third rate.

* * * * *